United States Patent
Mitchell, Jr. et al.

(10) Patent No.: US 11,395,956 B2
(45) Date of Patent: Jul. 26, 2022

(54) METALLIZED SCRATCH-OFF ON-DEMAND PRINTED CONSTRUCT

(71) Applicant: W/S Packaging Group, Inc., Greenbay, WI (US)

(72) Inventors: Chauncey T. Mitchell, Jr., Lakeland, TN (US); Patrick A. Young, Appleton, WI (US)

(73) Assignee: W/S Packaging Group, Inc., Batavia, OH (US)

( * ) Notice: Subject to any disclaimer, the term of this patent is extended or adjusted under 35 U.S.C. 154(b) by 529 days.

(21) Appl. No.: 16/326,323

(22) PCT Filed: Aug. 31, 2017

(86) PCT No.: PCT/US2017/049552
§ 371 (c)(1),
(2) Date: Feb. 18, 2019

(87) PCT Pub. No.: WO2018/045138
PCT Pub. Date: Mar. 8, 2018

(65) Prior Publication Data
US 2019/0184270 A1   Jun. 20, 2019

Related U.S. Application Data

(60) Provisional application No. 62/487,590, filed on Apr. 20, 2017, provisional application No. 62/473,033, (Continued)

(51) Int. Cl.
*A63F 3/06* (2006.01)
*B32B 7/04* (2019.01)
(Continued)

(52) U.S. Cl.
CPC ............. *A63F 3/0655* (2013.01); *A63F 3/06* (2013.01); *A63F 3/0665* (2013.01); *B32B 7/04* (2013.01);
(Continued)

(58) Field of Classification Search
CPC ........ A63F 3/0655; A63F 3/06; A63F 3/0665; B32B 7/04; B32B 29/00; B41M 3/005; B41M 3/142; B41M 3/14
(Continued)

(56) References Cited

U.S. PATENT DOCUMENTS

2003/0207066 A1   11/2003   Killey
2003/0224151 A1   12/2003   Mitchell, Jr. et al.
(Continued)

FOREIGN PATENT DOCUMENTS

WO   2016/118767 A1   7/2016
WO   WO-2016118767 A1 *   7/2016   ............. B41M 5/42

OTHER PUBLICATIONS

International Search Report and Written Opinion of PCT/US2017/049552 of the International Searching Authority completed Oct. 12, 2017 (11 pages).
(Continued)

*Primary Examiner* — Justin V Lewis
(74) *Attorney, Agent, or Firm* — Wood Herron & Evans LLP

(57) ABSTRACT

A direct thermal printable construct, such as a ticket, game piece, coupon, collection piece, label, security card, or voucher includes a thermally printable medium and a metallized layer bonded directly or indirectly to the thermally printable medium. A thermosensitive imaging layer of the thermally printable medium is printable by exposing the metallized layer to localized heat of a thermal printer for inducing local changes in the color of the thermosensitive
(Continued)

imaging layer that are obscured from view through both the metallized layer and a base substrate of the thermally printable medium. One or more areas of the metallized layer are arranged to be removable by a scratching action using a fingernail or coin for revealing the underlying local changes in the color of the thermosensitive imaging layer.

27 Claims, 6 Drawing Sheets

Related U.S. Application Data filed on Mar. 17, 2017, provisional application No. 62/383,419, filed on Sep. 3, 2016.

(51) Int. Cl.

| | |
|---|---|
| *B32B 7/12* | (2006.01) |
| *B32B 27/36* | (2006.01) |
| *B32B 27/06* | (2006.01) |
| *B32B 29/00* | (2006.01) |
| *B32B 27/10* | (2006.01) |
| *B32B 27/32* | (2006.01) |
| *B32B 37/26* | (2006.01) |
| *B32B 38/00* | (2006.01) |
| *B41M 3/00* | (2006.01) |
| *B41M 3/14* | (2006.01) |

(52) U.S. Cl.
CPC ............... *B32B 7/12* (2013.01); *B32B 27/06* (2013.01); *B32B 27/10* (2013.01); *B32B 27/32* (2013.01); *B32B 27/36* (2013.01); *B32B 29/002* (2013.01); *B32B 29/005* (2013.01); *B32B 37/26* (2013.01); *B32B 38/0004* (2013.01); *B32B 38/145* (2013.01); *B41M 3/005* (2013.01); *B41M 3/142* (2013.01); *A63F 2003/0675* (2013.01); *B32B 2037/268* (2013.01); *B32B 2255/10* (2013.01); *B32B 2255/12* (2013.01); *B32B 2255/205* (2013.01); *B32B 2255/26* (2013.01); *B32B 2307/302* (2013.01); *B32B 2307/402* (2013.01); *B32B 2307/406* (2013.01); *B32B 2307/408* (2013.01); *B32B 2307/4026* (2013.01); *B32B 2307/41* (2013.01); *B32B 2307/414* (2013.01); *B32B 2307/416* (2013.01); *B32B 2307/584* (2013.01); *B32B 2307/744* (2013.01); *B32B 2307/748* (2013.01); *B32B 2425/00* (2013.01); *B32B 2519/00* (2013.01)

(58) Field of Classification Search
USPC ... 283/72, 81, 91, 93, 94, 98, 100, 101, 111, 283/901, 903
See application file for complete search history.

(56) References Cited

U.S. PATENT DOCUMENTS

| | | |
|---|---|---|
| 2012/0149561 A1 | 6/2012 | Ribi et al. |
| 2018/0001684 A1* | 1/2018 | Mitchell, Jr. .......... B41M 3/005 |

OTHER PUBLICATIONS

International Preliminary Report on Patentability of PCT/US2017/049552 of the International Searching Authority dated Mar. 5, 2019 (10 pages).

* cited by examiner

METALLIZED SCRATCH-OFF ON-DEMAND PRINTED CONSTRUCT

TECHNICAL FIELD

The invention relates to constructs having an internal on-demand thermally printable layer hidden between substantially opaque layers. Information is thermally printed in the internal layer through one of the substantially opaque layers. The opaque layer can be manipulated for revealing the information that is on-demand printed in the internal layer.

BACKGROUND

Laminated constructs with hidden internal layers that can be printed on demand provide enhanced security over similar laminated constructs with preprinted layers because the on-demand printed laminated constructs do not require similar levels of security until on-demand printed, which can be delayed until a point of distribution, sale or use. For instance, the laminated constructs can take the form of game pieces in which a player can interact directly or indirectly with a gaming machine in a prescribed manner, and such game pieces printed as a result of the interaction can be dispensed. Information printed in an internal layer of the game piece, such as text or other graphics, can remain hidden until the player opens the game piece. The internal layer can be mounted on an inner face of a first substantially opaque lamina and can be covered by a second substantially opaque lamina. The substantially opaque nature of the laminae renders information printed in the internal layer hidden from view under ordinary unaided viewing and lighting conditions. The two laminae can be laminated together in a way that does not preclude their at least partial separation. The game piece is opened by at least partially separating the two substantially opaque laminae without shearing or otherwise damaging the printed internal layer that remains on one of the substantially opaque laminae.

The on-demand printed constructs of this type provide increased security over preprinted game pieces with hidden information printed on one substantially opaque lamina and covered by either a peelable substantially opaque lamina or a substantially opaque scratch-off wax, latex ink, or other coating. Extra care is required to assure that the preprinted information remains hidden from the time the game pieces are first printed at one site to the time game pieces are dispensed at another site. In contrast, on-demand printed game pieces have little or no added value until demand printed and dispensed on site. A programmable central computer system connected to one or more remote gaming machines via encrypted lines of communication can upon verification of an acceptable input, such as the insertion of cash or a cash equivalent into a remote gaming machine, transmit instructions to the individual gaming machines for printing hidden results according a predetermined algorithm, pattern, or result. Alternatively, the gaming machines themselves can be preprogrammed or preloaded with instructions for printing hidden results according a predetermined algorithm, pattern, or result. Upon verification of "win" by such gaming machines, a voucher or similar value credit, cash, or merchandise redemption can be dispensed.

One example of such an on-demand printable construct in the form of a pull tab game piece is disclosed in co-assigned U.S. Pat. No. 6,543,808 of Mitchell, Jr. et al. A base lamina of the pull tab game piece is at least partially transparent. A thermosensitive imaging layer overlies a front surface of the base lamina, and a substantially opaque coating overlies the thermosensitive imaging layer. A cover lamina, within which one or more peelable pull tabs are formed, is bonded to a back surface of the base lamina. The thermosensitive imaging layer can be direct thermal printed through the substantially opaque coating. When the one or more pull tabs are peeled back, the direct thermal printing is visible through the at least partially transparent base lamina.

Another such on-demand printable construct presented in the form of a ticket is disclosed in co-assigned U.S. Pat. No. 8,546,301 of Ribi et al. Two substantially opaque laminae straddle a thermosensitive imaging layer, which is thermally printable through one of the opaque laminae. In a preferred embodiment, a cover lamina is a metallized film through which the thermosensitive imaging layer can be direct thermal printed. An adhesive layer bonds the cover lamina to a base lamina straddling the thermosensitive imaging layer but is excluded from regions intended for thermal printing. Corner tabs die cut through the base lamina assist with the separation of the two laminae for revealing the thermal printing. The adhesive bonds are broken during the separation of the laminae evidencing that the ticket has been opened. Confusion patterns can be formed on both laminae to further obscure the printed contents of the tickets. For example, a first confusion pattern can be printed on the base lamina and a second confusion pattern can be embossed in the metallized film of the cover lamina or printed on one or both sides of the cover lamina.

Although the prior on-demand printable constructs offer significant security advantages over preprinted game pieces, the mechanisms of the on-demand printable constructs for revealing information differ significantly from the more popular scratch-off mechanisms of the preprinted game pieces. The required removal of an opaque lamina for revealing the hidden information can result in waste material that either remains attached to the game piece or is in some way discarded.

SUMMARY

The invention among some of its embodiments contemplates a direct thermal printable construct that includes a thermosensitive imaging layer located between opaque laminae. The thermosensitive imaging layer can be direct thermally printed through one of the opaque laminae in the form of a metallized film that can be subsequently rendered at least partially transparent by removing some of the metallization. The layer of metal that is subject to removal typically has a thickness measured in Angstroms, and its removal produces no significant waste.

While metallized films have been proposed for use in on-demand thermally printable constructs as opaque barriers through which thermal printing is still possible, the metallized films have been arranged for subsequent delamination to reveal underlying thermal printing. That is, the metallized coating is applied as a permanent part of a film backing. Thus, in the past, the metallized films themselves must be retracted or otherwise removed to reveal underlying thermal printing.

In contrast, embodiments of the invention contemplate techniques in which relevant portions of the metallized layer of a metallized film can be removed from its underlying film backing following direct thermal printing through the metallized film. Although the metallized layer can be overprinted or coated for various purposes including enhancing appearance or opacity and protecting against oxidation or other environmental hazards, the bond between the metallized layer and its film backing is sufficiently weak so that the metallized layer can be removed from its film backing by application of a sufficiently high abrading force. For example, the metallized layer can be rendered removable by abrading actions typically required for removing conventional wax or latex ink scratch-off coatings. Advantageously, the film backing, which provides a window through which the previously hidden results of direct thermal printing can be viewed, remains in place to protect the underlying thermosensitive imaging layer from the effects of the intended abrasion.

The referenced embodiments retain the advantageous use of metallized films as opaque laminae through which direct thermal printing remains possible, while altering the construction of the metallized films to enable the underlying thermal printing to be revealed by more conventional scratch-off techniques. The amount of material required for removal (e.g., scratched off) to reveal the underlying thermal printing can be so little as to be largely undetectable, thereby not only avoiding the production of film waste but also avoiding the production of unsightly crumbs that are associated with the removal of conventional wax or latex ink scratch-off coatings.

One version of the invention as a direct thermal printable construct includes a metallized film, a base substrate, and a thermosensitive imaging layer. The metallized film comprises a film backing and a metallized layer supported by the film backing. At least portions of the film backing are formed with a release surface on which the metallized layer is supported. The base substrate has front and back surfaces. The thermosensitive imaging layer subject to color change by thermal printing is located between the film backing of the metallized film and the front surface of the base substrate. In addition, the thermosensitive imaging layer is thermally printable by exposing the metallized film to localized heat of a thermal printer for inducing local changes in the color of the thermosensitive imaging layer that are obscured from view through both the metallized film and the base substrate. However, one or more areas of the metallized layer that overlie the thermosensitive imaging layer are arranged to be removable from the release surface of the film backing for revealing underlying local changes in the color of the thermosensitive imaging layer through the film backing.

In a preferred form, the film backing includes front and back surfaces, the release surface is formed on the front surface of the film backing, and the back surface of the film backing faces the thermosensitive imaging layer. The release surface can be formed by a release layer applied to the front surface of the film backing or by various material selections and treatments of the front surface of the film backing to achieve a limited amount of adhesion between the film backing and the metallized layer. The treatments can include appropriate surface preparations for a selected film backing material. For example, instead of optimizing parameters including interface chemistries and morphologies for adhering a metallized deposit on the front face of the film backing, one or more of these parameters can be slightly compromised so that the metallized layer is mounted in a stable fashion but can be scraped off the front surface of the film backing by scratching with a fingernail or coin. Alternatively, a release layer can be formed at the interface onto which the metallized layer is deposited, where at least one of the bonds between the metallized layer and the release layer, between the release layer and the front face of the film backing, or within the release layer is subject to shearing by the desired scraping action.

According to one approach, the thermosensitive imaging layer can be supported on the front surface of the base substrate, and the metallized film can be permanently bonded to the base substrate by a layer of adhesive between the thermosensitive imaging layer and the back surface of the film backing. According to another approach, the thermosensitive imaging layer can be supported on the back surface of the film backing, and the metallized film can be permanently bonded to the base substrate by a layer of adhesive between the thermosensitive imaging layer and the front surface of the base substrate.

The metallized layer can be covered by a protective coating that is removable together with the one or more areas of the metallized layer from the release surface exposing one or more windows through the film backing for viewing the underlying local changes in the color of the thermosensitive imaging layer. The metallized layer can be overprinted to distinguish the one or more areas of the metallized layer that are arranged or otherwise intended for release from the film backing from one or more other areas of the metallized film. The metallized film can be confined to cover one or more limited areas of the base substrate such that at least one other area on the front surface of the base substrate is exposed to view. The one or more areas of the metallized layer that are removable from the release surface of the film backing are among the one or more limited areas of the base substrate that are covered by the metallized film.

In a preferred form, the one or more areas of the metallized layer that are removable from the release surface of the film backing are removable by a scratching action using a fingernail or coin while exposing the film backing as one or more windows for viewing the underlying local changes in the color of the thermosensitive imaging layer. Further, the one or more areas of the metallized layer that are removable from the release surface of the film backing can be arranged as a plurality of distinct islands for identifying areas of the metallized layer that are intended for removal to reveal the underlying local changes in the color of the thermosensitive imaging layer.

Where needed, at least some of the distinct islands are overprinted by a confusion pattern preferably having varying reflectivity characteristics for obscuring apparent changes in the reflectivity of the metallized layer associated with the localized heat of a thermal printer. The confusion pattern can be formed by two or more inks having different levels of gloss. At least one additional island can be arranged thermally printable by the exposure to the localized heat of the thermal printer for inducing local changes in the reflectivity of the metallized film of the at least one additional island. Preferably, the local color changes of the thermosensitive imaging layer and the local reflectively changes of the metallized film are achievable at the same power settings of the thermal printer.

Another version of the invention as a metallized film for a direct thermal printable construct includes a film backing having a release surface and a metallized layer supported on the release surface of the film backing. The film backing has front and back surfaces with the release surface formed on the front surface of the film backing. A thermosensitive imaging layer formed on the back surface of the film backing is thermally printable by exposing the metallized film to localized heat of a thermal printer for inducing local changes in the color of the thermosensitive imaging layer that are obscured from view through the film backing by the metallized layer. One or more areas of the metallized layer that overlie the thermosensitive imaging layer are removable from the release surface of the film backing for revealing underlying local changes in the color of the thermosensitive imaging layer through the film backing.

The release surface can be formed by a release coating applied to the front surface of the film backing. Alternatively, the release surface can be formed by treating the front surface of the film backing to exhibit a limited amount of adhesion with the metallized layer. The metallized layer supported on the release surface of the film backing can be covered by a protective coating that is removable together with the one or more areas of the metallized layer from the film backing exposing a window through the film backing for viewing the underlying local changes in the color of the thermosensitive imaging layer.

The metallized layer deposited onto the release surface of the film backing can overprinted by an ink to distinguish the one or more areas of the metallized layer arranged for release from the film backing from one or more other areas of the film backing. Preferably, the one or more areas of the metallized layer that are removable from the release surface of the film backing are removable by a scratching action using a fingernail or coin while exposing the film backing as one or more windows for viewing the underlying local changes in the color of the thermosensitive imaging layer.

In addition, the one or more areas of the metallized layer that are removable from the release surface of the film backing can be arranged as a plurality of distinct islands for identifying areas of the metallized layer that are intended for removal to reveal the underlying local changes in the color of the thermosensitive imaging layer. At least some of the distinct islands can be overprinted by a confusion pattern preferably having varying reflectivity characteristics for obscuring local changes in the reflectivity of the metallized layer associated with the localized heat of a thermal printer.

The locations of the individual islands are preferably preplanned or otherwise made identifiable to a thermal printer for registering on-demand thermal printing of the information intended to be temporarily hidden by the islands. For example, the individual constructs, such as in the form of game pieces, can be encoded at the time of manufacture, such as by preprinting codes or registration marks, for identifying the relative locations of the islands on the game pieces, and a reader or other sensor can be associated with the on-demand thermal printer for printing the intended hidden information at these locations. Preprinted encoding can also be used to distinguish different games of play, such as by identifying particular types or batches game pieces to a central processor so that a single on-demand printer can be used for printing and dispensing game pieces associated with different games. Single or multiple color changes in the thermosensitive imaging layer can be effected between different areas of the base substrate or within the same area of the base substrate such as by regulating the printing temperature.

A clear varnish can be applied over the printed confusion pattern to reduce friction and surface irregularities that could interfere with the operation of a thermal printer, particularly a thermal printhead.

At least a portion of the metallized layer can appear as a diffuse reflective surface for reducing apparent changes in the reflectivity of the metallized layer associated with the localized heat of the thermal printer. The release surface can express micro-surface geometry variations that are incorporated into the metallized layer for forming the metallized layer with a diffuse reflective surface. For example, the front surface of the film backing can be formed with the micro-surface geometry variations that are expressed in the release surface or the release surface can be formed by a release layer containing particulates for forming the release surface as a matte surface.

Another version of the invention as a direct thermal printable construct includes an opaque cover lamina permanently bonded to an opaque base lamina entrapping a thermosensitive imaging layer between the cover lamina and the base lamina. The cover lamina includes a metallized layer deposited onto an at least translucent film backing. The thermosensitive imaging layer is thermally printable by exposing the cover lamina to localized heat of a thermal printer for inducing local changes in the color of the thermosensitive imaging layer that are obscured from view through the film backing by the metallized layer. The film backing includes a front surface arranged as a release surface onto which the metallized layer is deposited and a back surface facing the base substrate. The release surface is formed by at least one of (a) a surface treatment for adjusting at least one of interface chemistries and morphologies for adhering the metallized layer to the film backing and (b) a release layer between the metallized layer and the film backing. Local areas of the metallized layer that is deposited onto the release surface are removable from the film backing by a scratching action using a fingernail or coin while exposing the film backing as one or more windows for viewing the underlying local changes in the color of the thermosensitive imaging layer.

For example, the release surface can be formed by the release layer which forms a bond between the metallized layer and the film backing that is arranged to be locally sheared by the scratching action at one or more of (a) an interface between the metallized layer and the release layer, (b) an interface between the release layer and the film backing, and (c) within the release layer. The release surface could also be formed by the surface treatment which forms a bond between the metallized layer and the film backing that is arranged to be locally sheared by the scratching action. As such, the film backing can be formed by a polymer and the surface treatment can include a preparation of a surface of the polymer for receiving the metallized layer by vacuum deposition.

Although the film backing remains functional as a window through which the underlying local changes in the color of the thermosensitive imaging layer can be viewed, the film backing can also be die cut or otherwise fractured in place on the base substrate to enhance tamper evidency.

The invention also contemplates a direct thermal printable construct that does not require laminae. For example, a thermally printable medium of such a construct can have front and back surfaces, a base substrate proximate the back surface, and a thermosensitive imaging layer proximate the front surface. The thermosensitive imaging layer is subject to color change by thermal printing. At least one or more portions of the thermosensitive imaging layer are covered with a release surface. At least one or more portions of a metallized layer are releasably bonded to the front surface of the thermally printable medium through the release surface. The thermosensitive imaging layer is thermally printable by exposing the metallized layer to localized heat of a thermal printer for inducing local changes in the color of the thermosensitive imaging layer that are obscured from view through both the metallized layer and the base substrate. One or more areas of the metallized layer are arranged to be removable from the front surface of the thermally printable medium via the release surface for revealing underlying local changes in the color of the thermosensitive imaging layer.

The release surface can comprise a release layer that forms a bond between the metallized layer and the front surface of the thermally printable medium that is arranged to be locally sheared by a scratching action of a fingernail or coin at one or more of (a) an interface between the metallized layer and the release layer, (b) an interface between the release layer and the front surface of the thermally printable medium, and (c) within the release layer. Alternatively, the release surface can be formed by treating the front surface of the thermally printable medium to exhibit a limited amount of adhesion with the metallized layer for forming a bond between the metallized layer and the thermally printable medium that can be locally sheared by a scratching action of a fingernail or coin.

The metallized film can be overprinted to distinguish the one or more areas of the metallized layer arranged for release from the front surface of the thermally printable medium in positions overlying areas of the thermosensitive imaging layer that are registered for thermally printing hidden indicia from one or more other areas of the metallized layer. The metallized layer can be confined to covering one or more limited areas of the front surface of the thermally printable medium such that at least one other area on the front surface of the thermally printable medium is not covered by the metallized layer. The one or more areas of the metallized layer that are removable from the front surface of the thermally printable medium are preferably removable by a scratching action using a fingernail or coin for viewing the underlying local changes in the color of the thermosensitive imaging layer.

The one or more areas of the metallized layer that are removable from the front surface of the thermally printable medium can be arranged as a plurality of distinct islands for identifying areas of the metallized layer that are intended for removal to reveal the underlying local changes in the color of the thermosensitive imaging layer. At least some of the distinct islands can be overprinted by a confusion pattern arranged for obscuring apparent changes in the reflectivity of the metallized layer associated with the localized heat of the thermal printer. The one or more areas of the metallized layer that are removable from the release front surface of the thermally printable medium by a scratching action using a fingernail or coin can be distinguished from areas of the metallized layer that are protected by a scratch-resistant layer.

One or more portions of the thermosensitive imaging layer can be arranged so as to be not covered with the release surface. The at least one or more other portions of a metallized layer can cover portions of the thermosensitive imaging layer that are not covered by the release surface to form a more permanent bond with the front surface of the thermally printable medium or the metallized layer can be limited to covering only portions of the thermosensitive imaging layer that are covered by the release surface. Especially where the release surface is at least largely undifferentiated, the one or more portions of a metallized layer can be limited to covering some portions of the thermosensitive imaging layer that are covered by the release surface while not covering other portions of the thermosensitive imaging layer that are covered by the release surface.

In addition, the release surface can be formed as a protective coating covering the thermosensitive imaging layer. Alternatively, a protective coating can be provided to cover the thermosensitive imaging layer and the release surface can be formed by a release layer between the metallized layer and the protective coating. In general, the intended break, e.g. shear, for removing the metallized layer can occur within or between any of one or more layers between the metallized layer and the thermosensitive imaging layer so long as the integrity of thermally printed indicia in the thermosensitive imaging layer is preserved.

At least a portion of the metallized layer can appear as a diffuse reflective surface for reducing apparent changes in the reflectivity of the metallized layer associated with the localized heat of the thermal printer. The release surface can express micro-surface geometry variations that are incorporated into the metallized layer for forming the metallized layer with a diffuse reflective surface. For example, the front surface of the thermally printable medium can be formed with the micro-surface geometry variations that are expressed in the release surface or the release surface can be formed by a release layer containing particulates for forming the release surface as a matte surface.

Another version of the invention as a method of making direct thermal printable constructs includes advancing a web of a thermally printable medium having front and back surfaces and including a base substrate and a thermosensitive imaging layer subject to color change by thermal printing proximate the front surface. A release surface is formed over at least one or more portions of the front surface of the thermally printable medium, and a metallized layer is applied over at least one or more portions of the release surface on the front surface of the thermally printable medium without an intervening substrate, wherein the metalized layer is releasably bonded to the front surface of the direct thermally printable medium through the release surface.

Preferably, the thermosensitive imaging layer is thermally printable by exposing the metallized layer to localized heat of a thermal printer for inducing local changes in the color of the thermosensitive imaging layer that are obscured from view through both the metallized layer and the base substrate, and the metallized layer is arranged to be removable from the front surface of the thermally printable medium for revealing the local changes in the color of the thermosensitive imaging layer. The step of forming the release surface can includes applying a release layer that forms a bond between the metallized layer and the front surface of the thermally printable medium that is arranged to be locally sheared by a scratching action of a fingernail or coin at one or more of (a) an interface between the metallized layer and the release layer, (b) an interface between the release layer and the front surface of the thermally printable medium, and (c) within the release layer. Alternatively, the release surface can be formed by treating the front surface of the thermally printable medium to exhibit a limited amount of adhesion with the metallized layer for forming a bond between the metallized layer and the thermally printable medium that can be locally sheared by a scratching action of a fingernail or coin.

The metallized layer can be overprinted to identify one or more areas of the metallized layer arranged for release from the front surface of the thermally printable medium in positions overlying areas of the thermosensitive imaging layer that are registered for thermally printing hidden indicia. The step of applying the metallized layer can include confining the metallized layer to covering one or more limited areas of the front surface of the thermally printable medium such that at least one other area on the front surface of the thermally printable medium is not covered by the metallized layer. The one or more limited areas of the metallized layer are removable by a scratching action using a fingernail or coin for viewing underlying local changes in the color of the thermosensitive imaging layer. The step of applying the metallized layer can also include arranging the one or more limited areas of the metallized layer that are removable from the front surface of the thermally printable medium as a plurality of distinct islands for identifying areas of the metallized layer that are intended for removal to reveal the underlying local changes in the color of the thermosensitive imaging layer.

The step of forming the release surface can include confining the release surface to covering one or more limited portions of the front surface of the thermally printable medium such that at least one other portion of the front surface of the thermally printable medium is not covered by the release surface. The step of applying the metallized layer can include applying the metallized layer over both the one or more limited portions of the front surface of the thermally printable medium that are covered by the release surface and one or more other portions of the front surface of the thermally printable medium that are not covered by the release surface to form a more permanent bond between the metalized layer and the one or more other portions of the front surface of the thermally printable medium. Alternatively, the step of applying the metallized layer can include confining the metallized layer to the one or more limited portions of the front surface of the thermally printable medium that are covered by the release surface. A scratch-resistant covering can be provided over limited areas of the metallized layer to distinguish the limited areas of the metalized layer from other areas of the metallized that are intended to be removable from the front surface of the thermally printable medium to reveal the underlying local changes in the color of the thermosensitive imaging layer.

The step of forming the release surface can include applying a layer of release in one or more stripes along a length of the advancing web. The thermosensitive imaging layer can be similarly arranged in one or more stripes in registry with the one or stripes of the release surface. The step of forming the release surface can include applying a protective coating to protect the thermosensitive imaging layer from abrasion. Alternatively, a protective coating can be applied over the thermosensitive imaging layer and the step of forming the release surface can include applying a release layer over the protective coating.

The step of forming the release surface can include arranging the release surface to express micro-surface geometry variations that are incorporated into the metallized layer for forming the metallized layer with a diffuse reflective surface. In this regard, the front surface of the thermally printable medium can be formed with the micro-surface geometry variations that are expressed in the release surface.

The web of the thermally printable medium can be cut into at least one of rolls, fan-folded stacks, and sheets to prepare the direct thermal constructs for thermal printing through the metallized layer for inducing the local changes in the color of the thermosensitive imaging layer that are obscured from view through both the metallized layer and the base substrate. The direct thermal constructs can be thermally printing at a dispensing station for inducing the local changes in the color of the thermosensitive imaging layer that are obscured from view through both the metallized layer and the base substrate in response to user input at the dispensing station. The local changes in the color of the thermosensitive imaging layer that are obscured from view comprise hidden indicia can be uniquely generated for each of the direct thermal constructs, and the uniquely generated hidden indicia that is thermally printed at the dispensing station can be communicated between a remote controller and the dispensing station. In addition, color printing can be applied over the front surface of the thermally printable medium at the dispensing station in a fashion that is not obscured by the metallized layer in response to user input at the dispensing station.

The step of applying the metallized layer preferably includes vapor depositing a metal onto the front surface of the thermally printable medium. In this regard, the front surface of the thermally printable medium can be masked to limit areas of the front surface of the thermally printable medium to which the metallized layer is applied.

BRIEF DESCRIPTION OF THE DRAWING FIGURES

DETAILED DESCRIPTION

Figure 1:
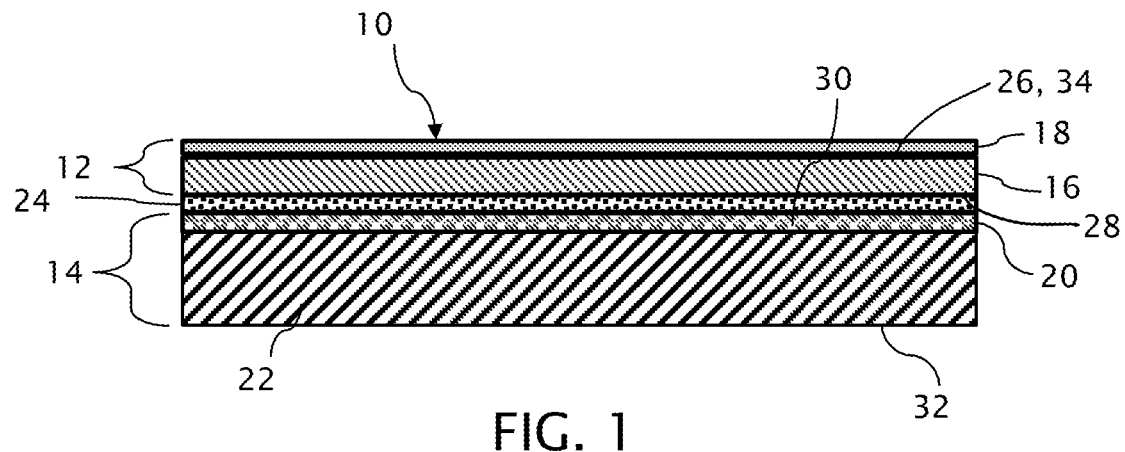
FIG. 1 is a cross-sectional side view of the thermal printable construct in which layers of the construct are depicted with increased thickness to better distinguish the layers.

FIG. 1 depicts a direct thermal printable construct 10 in accordance with one embodiment of the invention. The construct 10, which can be printed for various purposes including as a ticket, game piece, coupon, collection piece, label, security card, or voucher, includes a cover lamina 12 in the form of a metallized film and a base lamina 14 in the form of a thermally printable medium. Although reference is made to front and back surfaces, layers, or other features to distinguish their relative positions or orientations in the drawings, the relative positions and orientations of these features can be collectively inverted or reversed during actual use. The cover lamina 12 and base lamina 14 include substrates that originate in web or sheet form, such as paper or film, and are capable of independently holding such form as structures onto which other layers incapable of holding such independent form can be deposited or otherwise applied.

As depicted, the metallized film cover lamina 12 includes a clear or at least translucent film backing 16 and a metallized layer 18 deposited onto or otherwise supported on the clear film backing 16 rendering the cover lamina 12 substantially opaque. The thermally printable medium base lamina 14 includes a thermosensitive imaging layer 20 atop a paper or film base substrate 22 and can be of a type that is commercially available or can be formed by coating the thermosensitive imaging layer 20 on a choice of base substrates 22. The thermosensitive imaging layer 20 can be arranged to support single or multiple thermally induced color changes. Multiple color changes in the thermosensitive imaging layer can be effected between different areas of the base lamina 14 or within the same area of the base lamina 14 such as by incorporating different temperature-sensitive dyes and regulating printing temperatures accordingly. Preferably, the thermally printable medium base lamina 14 is substantially opaque as a result of its composition alone or in combination with additional coating or printing. For example, a direct thermal security stock, such as SecuraTherm® printing stock from Appvion, Inc. of Appleton, Wis. with a color centered security feature, can be used for verification and fraud protection as well as to increase opacity.

The metallized film cover lamina 12 can be formed as a polymer film backing coated with a thin layer of metal, such as aluminum. Such metallized films can offer the glossy metallic appearance of an aluminum foil at a reduced weight and cost and have been used for decorative purposes and food packaging, and also for specialty applications including insulation and electronics.

For example, metallization can be utilized to form a highly opaque yet very thin metal layer 18. Such metal layers have the advantage of supporting good thermal conductivity between thermal printers and the thermosensitive imaging layer 20 via the metallized film cover substrate 12 and the adhesive layer 24. As much as 99% of light, including much of the infrared spectrum, can be reflected by such metallized films.

Physical vapor deposition (PVD) is a form of vacuum deposition and is a general term used to describe any of a variety of methods to deposit thin films by the condensation of a vaporized form of the material onto various surfaces. The coating method involves largely physical processes such as high temperature vacuum evaporation or plasma sputter bombardment rather than involving a chemical reaction at the surface to be coated as in chemical vapor deposition.

Variants of PVD of interest include but are not limited to various processes in which the material to be deposited is heated to a high vapor pressure by electrically resistive heating in "low" vacuum. Electron beam physical vapor deposition involves heating the target material to be deposited to a high vapor pressure by electron bombardment in "high" vacuum. Sputter deposition involves a glow plasma discharge (usually localized around the target material by a magnet) that bombards the target material, sputtering some away as a vapor. Cathodic Arc Deposition involves a high-power arc directed at the target material, which blasts away some of the target material into a vapor. Pulsed laser deposition involves a high-power laser that ablates material from the target into a vapor.

Metallized, including holographic or prismatic, thin films provide a combination of high opacity, facile thermal diffusion, conductivity between the thermal printers and thermosensitive printable media, affordability and commercial availability, ability to be further printed for informational purposes, and ease of use in high speed automated printing and manufacturing processes. For thermal printing units that deliver moderate to low temperatures and printing energies, it is desirable to use thin highly responsive obscuring films. In other cases when printing units are utilized that operate at higher printing temperatures and energies, it is feasible to utilize thicker less responsive obscuring films. In additional to generally resistive based thermal printheads, other print units for direct thermal imaging are based on LED or laser technologies.

Metallized layers coated on plastic resin-based film backings can range from over 100 microns to a few molecular layers of metal depending on the required parameters for printing and product constructs. Usually, metallized layers will range between 50 microns and 0.5 nanometers. More often metal layers will range 10 microns to 1 nanometer. Typically, metal layers will find use between 1 micron and 2 nanometers.

Metallized films including both the metallized substantially opaque layer 18 and supporting plastic resin-based film backing 16 exhibit favorable properties of being thin, present good thermal transfer characteristics, do not adversely affect the performance of a thermal printheads in a thermal printing unit, have the strength and integrity to act as a robust lamina in on-demand secured printing articles, can be utilized with commercial printing and processing presses and equipment, are affordable for the applications of interest, are highly obscuring and do not readily reveal printed information in a secured printed article, are visually appealing, may be further printed on the exposed side with ancillary information for use, are flexible and can be readily manipulated, such that the film is stable to adhesives and laminating process necessary for making functional articles. Tints can also be added to the film backing to match or contrast with underlying printing.

Obscuring metallized films can find use in the range of 2 microns to 500 microns in thickness when including an obscuring metallized layer 18 and the film firm backing 16. Often, film backings 16 can be utilized in the range between 3 microns and 250 microns. More often, film backings 16 ranging between 4 microns and 100 microns. Usually films possessing adequate integrity, commercial availability, and properties for the application will range between 5 microns and 50 microns in film thickness. Metallized films in the 8 to 10 micron range have been found to provide adequate strength and thermal conductivity for an embodiment of this invention.

The metallized film cover lamina 12 is permanently bonded to the thermally printable medium base lamina 14 through an adhesive layer 24, such as a conventional pressure sensitive adhesive. While the adhesive layer 24 is preferably strong enough to form a permanent bond between metallized film cover lamina 12 and the thermally printable medium base lamina 14, the adhesive layer 24 is preferably selected and applied at a limited thickness to support sufficient thermal conductivity between the cover and base laminas 12 and 14 so that images can be formed in the thermosensitive imaging layer 20 by thermally printing through the metallized film cover lamina 12 and the adhesive layer 24, such as at customary heat and pressure settings of a thermal printhead.

The metallized layer 18 is deposited onto or otherwise supported on a front surface 26 of the film backing 16, and the thermosensitive imaging layer 20, which is supported on a front surface 30 of the base substrate 22, faces a back surface 28 of the film backing 16. Thus, the metallized layer 18 is separated from the thermosensitive imaging layer 20 by the film backing 16 and the adhesive layer 24. In contrast to the usual permanent bond at interface between the metallized layer 18 and the film backing 16, a release surface 34 is formed on the front surface 26 of the film backing 16 to relatively weaken the interface bond to allow the metallized layer 18 to be scratched off of the film backing 16.

While conventional metallized films are known to exhibit good adhesion characteristics between their metallized layer and film base such that the metallized layer becomes a permanent part of the film backing, embodiments of this invention limit the amount of adhesion between the metallized layer 18 and the film backing 16 in one or more of a variety of ways. The adhesion is calibrated, for example, so that (a) the metallized layer 18 remains affixed to the film backing 16 during manufacturing operations for forming the desired constructs, as well as during storage, transport, and normal handling, which can include flexing, rubbing, and other environmental encounters associated with routine use, and (b) the metallized layer 18 is locally removable from the film backing 16 by a scratching action of a fingernail or coin of a character used for removing scratch-off waxes or latex inks on conventional lottery tickets.

The desired limited adhesion can be achieved, for example, by applying a layer of release, such as silicone, to a conventionally prepared film arranged for metal deposition. During vapor deposition of a metal, such as aluminum, the silicone layer forms an adequate bond with the deposited metal to hold the deposited metal layer in place. However, the bond formed between the metallized layer 18 and the film backing 16 can be readily broken in localized area, e.g., locally sheared, by the scratching action of a fingernail a coin. The release layer could also be formed by weak adhesives or other bonding materials whereby the calibrated bond between the metallized layer and the film backing can be locally broken at one or more of (a) the interface between the metallized layer and the layer of weak adhesive, (b) the interface between the layer of weak adhesive and the film backing, or (c) within the layer of weak adhesive, e.g., overcoming cohesion.

Alternatively or in addition, the front surface 26 of the film backing 16 can be arranged or otherwise treated to function as the release surface 34. The interfacial properties between film backings and metallized deposits have long been optimized to form durable bonds between film backings and metallized layers that prevent the removal of the metallized layers by abrasive encounters such as the scratching of the metallized layers by a fingernail or coin. In general, the desired mechanical and chemical bonding at the interface has been achieved by optimizing a number of known parameters associated with the deposition process and the surface onto which the metal is deposited. Some film materials such as polyethylene terephthalate (PET) contain groups that are known to react with metals such as aluminum to form chemical bonds. Other film materials such as polyethylene and polypropylene react differently. Chemical processes producing intervening weakening layers are generally avoided for purposes of making a permanent bond. Mechanical adhesion occurs in part by the penetration of the metal atoms into the surface of the film backing, which can be controlled in a number of ways such as by increasing or decreasing crystalline structures of the film backing. Surface energy of the film backings has also been controlled to make the surfaces of the film backings more receptive to metallized deposits. For purposes of certain embodiments of this invention, one or more of the parameters that are controlled for achieving high bonding strength can be slightly compromised so that the metallized layer is mounted in a stable fashion but can be scraped off the front surface of the film backing by scratching with a fingernail or coin.

The on-demand printable constructs 10 can be made as a succession of individual constructs 10, such as in the form of tickets, game pieces, coupons, collection pieces, labels, security cards, or vouchers, along an in-line press as a roll or stack, e.g., fan-folded stack, of the constructs 10, for further processing, distribution, or use. For example, both the metallized film cover lamina 12 and the thermally printable medium base lamina 14 can be supplied to an in-line press as webs in various stages of completion. The two webs can be further processed, laminated together following the application of the adhesive layer 24 to one or the other webs, subject to various possible forms of cutting, including die cutting through one or both webs in the form of patterns, slits or perforations, removing any unwanted matrix, and arranging the succession of constructs 10 as a roll or stack of constructs 10. The further processing on press can include printing, coating, or adding additional laminae to either or both webs.

Figure 2:
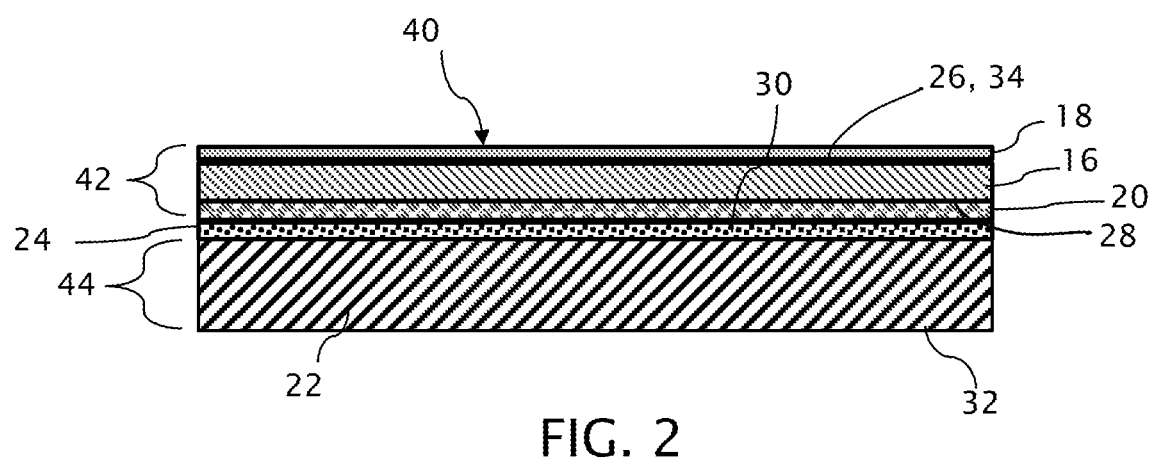
FIG. 2 is a similar cross-sectional side view of an alternative thermal printable construct with reordered layers.

FIG. 2 depicts an alternative direct thermal printable construct 40 sharing a number of similar layers, which retain corresponding reference numbers, but supporting the thermosensitive imaging layer 20 on the back surface 28 of the film backing 16 instead of on the front surface 30 of the base substrate 22. Thus, a metallized film cover lamina 42 comprises not only the metallized layer 18 and its film backing 16 but also comprises the thermosensitive imaging layer 20 supported on (e.g. applied to) the back surface 28 of the film backing 16. With this arrangement, the metallized film is only separated from the thermosensitive imaging layer 20 by the film backing 16 creating a shorter and more direct conductive path for printing images in the thermosensitive imaging layer 20 through the metallized film. The arrangement allows the film backing 16 to be made more substantial, e.g., with an increased thickness.

The base lamina 44 of the direct thermal printable construct 40 comprises the base substrate 22. The adhesive layer 24 is located between the thermosensitive imaging layer 20 and the front surface 30 of the base substrate 22 to bond the film backing 16 to the base substrate 22. The metallized film cover lamina 42 can be separately produced and marketed for use with a number of different base substrates covering a variety of materials, dimensions, constructions, and intended uses. For example, the metallized film cover lamina can be supplied with the adhesive layer 24 protected by a release liner that is removable for subsequently affixing the metallized film cover lamina to another substrate of choice. The release liner also provides support for die cutting through the metallized film cover lamina for such purposes as controlling the size and shape of the portions of the cover lamina that are laminated to the base substrate of choice. The on-demand printable constructs 40 can supplied as web intended for further processing alone or in conjunction with a release liner or base substrate. For example, the constructs 40 together with a release liner can be further be further processed and separated by die cuts along an in-line press as a roll or stack of labels that can be later affixed to one or more base substrates of choice by an automated or manual process. The further processing on press can include printing, coating, or adding additional laminae to the construction.

Figure 3:
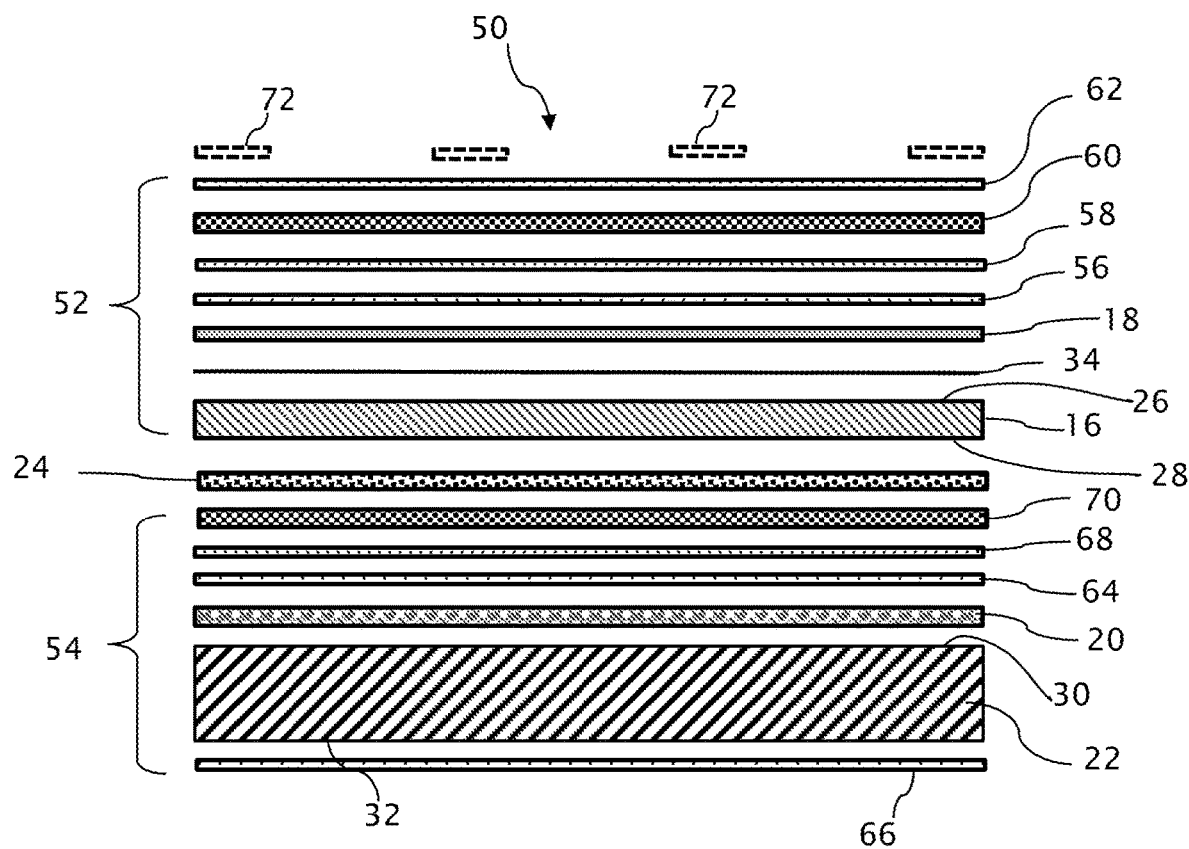
FIG. 3 is an exploded cross-sectional side view of a thermal printable construct similar to the construct of FIG. 1 taken along line 3-3 of FIG. 4 but including a number of additional layers for performing various functions.

FIG. 3 depicts an alternative direct thermal printed construct 50 in an exploded view for better distinguishing added layers that are incorporated for enhancing the appearance or performance of the construct 50. Layers in common with the previous embodiments share similar reference numbers, which are ordered similar to the construct 10 of FIG. 1. The construct 50 includes a metallized film cover substrate 52 bonded to a thermally printable medium base lamina 54 by the layer 24 of permanent adhesive.

The metallized film cover substrate 52 include the familiar layers of a metallized layer 18 supported on the front surface 26 of a film backing 16. The release surface 34 is shown as a separate layer, such as a silicone coating, but could also be formed as a specially adapted interface between the metallized layer 18 and the film backing 16 as explained above. A protective coating 56, particularly of a type normally used for protecting the metallized layer 18 from oxidation and other environmental hazards, is applied over the metallized layer 18. A press ink-receptive coating 58 atop the protective coating 56 or as a part of the protective coating 56 readies the metallized film cover substrate 52 for printing as represented by the printed layer 60. Particularly for use with a thermal printhead, the printed layer 60 is covered by a printhead slip coating 62, which can take the form of a varnish.

The thermally printable medium base lamina 54 also includes a number of layers in addition to the thermosensitive imaging layer 20 supported on the base substrate 22. For example, in accordance with conventional practices, the thermosensitive imaging layer 20 has a top coating 64 for protecting the underlying thermal chemistry of the thermosensitive imaging layer 20. In addition, a bottom coating 66 can be applied to the back surface 32 of the base substrate 22 to protect both the base substrate 22 and the thermal chemistry of the thermosensitive imaging layer 20. For printing atop the base substrate 22, a press ink-receptive coating 68 is applied over the top coating 64 or incorporated into the top coating 64 to better support a printed layer 70. Unless the metallized film cover substrate 52 is partially stripped of its metallized layer 18, cut into one or more limited size shapes, or is otherwise undersized with respect to the thermally printable medium base lamina 54, the printed layer 70 would not be expected to be visible upon assembly of the construct 50 until one or more areas of the metallized layer 18 are scratched off to provide a viewing window through the film backing 16. The colors, patterns, or graphic images of the printed layer 70 can be coordinated with the expected subsequent on-demand thermal printing of the thermosensitive imaging layer 20 for such purposes as enhancing the appearance, security, or functioning of the construct 50. For example, covert images could be randomly preprinted within the print layer 70 to enhance a game experience such as revealing special bonuses or tinting certain areas with a highlighted color value, e.g., using gold or silver ink. Although not shown in FIG. 3, a printed layer could also be applied to the back surface 28 of the film backing 16 as an alternative or addition to the print layer 70 on the front surface 30 of the base substrate 22.

The various preparatory and protective layers are generally used only where necessary or convenient for carrying out their intended functions. For example, the press ink-receptive coatings 58 and 68 can be replaced by surface treatments such as corona discharge treatments to control surface energy, adaptations of the underlying materials of the printed surface to increase their ink receptiveness or adaptations of the printing ink itself to properly adhere to the printed surface. The various protective coatings, including the protective coating 56 for the metallized layer 18 and the top and bottom coatings 64 and 66 for protecting the thermosensitive imaging layer 20, can be replaced by or incorporated into other layers that provide the required protection while performing one or more other intended function such as inks, varnishes, adhesives, or other materials contributing the printing, appearance, structure, or function of the construct 50 in direct or indirect contact with the layer requiring protection.

While the various layers of the constructs 10, 40, and 50 are shown in an uninterrupted fashion, the various layers can be pattern coated, die cut and stripped, or otherwise removed to overlap only in limited areas of the constructs. Other portions of the same layers can be provided with different characteristics. For example, while the permanent adhesive layer 24 preferably protects areas of the constructs that are thermally printed with hidden information from unintended forms of exposure, the cover and base lamina can be joined by a releasable adhesive or no adhesive at all in other areas of the constructs to permit the removal of the other areas of the cover lamina for such purposes as limiting the scratch-off areas on the base lamina or providing a different mode of exposing hidden information such as by forming pull-tabs. Although referred to as "die cutting," the contemplated cutting can be carried out in a number of other known ways that do not require a die including laser cutting or etching.

For example, the metallized layer 18 and film backing 16, as well as other layers of the metallized film cover substrates 12, 42, and 52, can be die cut into one or more areas such as islands with a surrounding matrix removed to occupy limited areas on the base laminae 14, 44, and 54 for temporarily concealing thermally printed information in the thermosensitive imaging layer 20. The metallized layer 18 and film backing 16 together with other layers of the metallized film cover substrates 12, 42, and 52 can also be die cut or otherwise fractured in place as a tamper-evident measure to discourage attempts to remove and restore the metallized film cover substrate 52.

Figure 4:
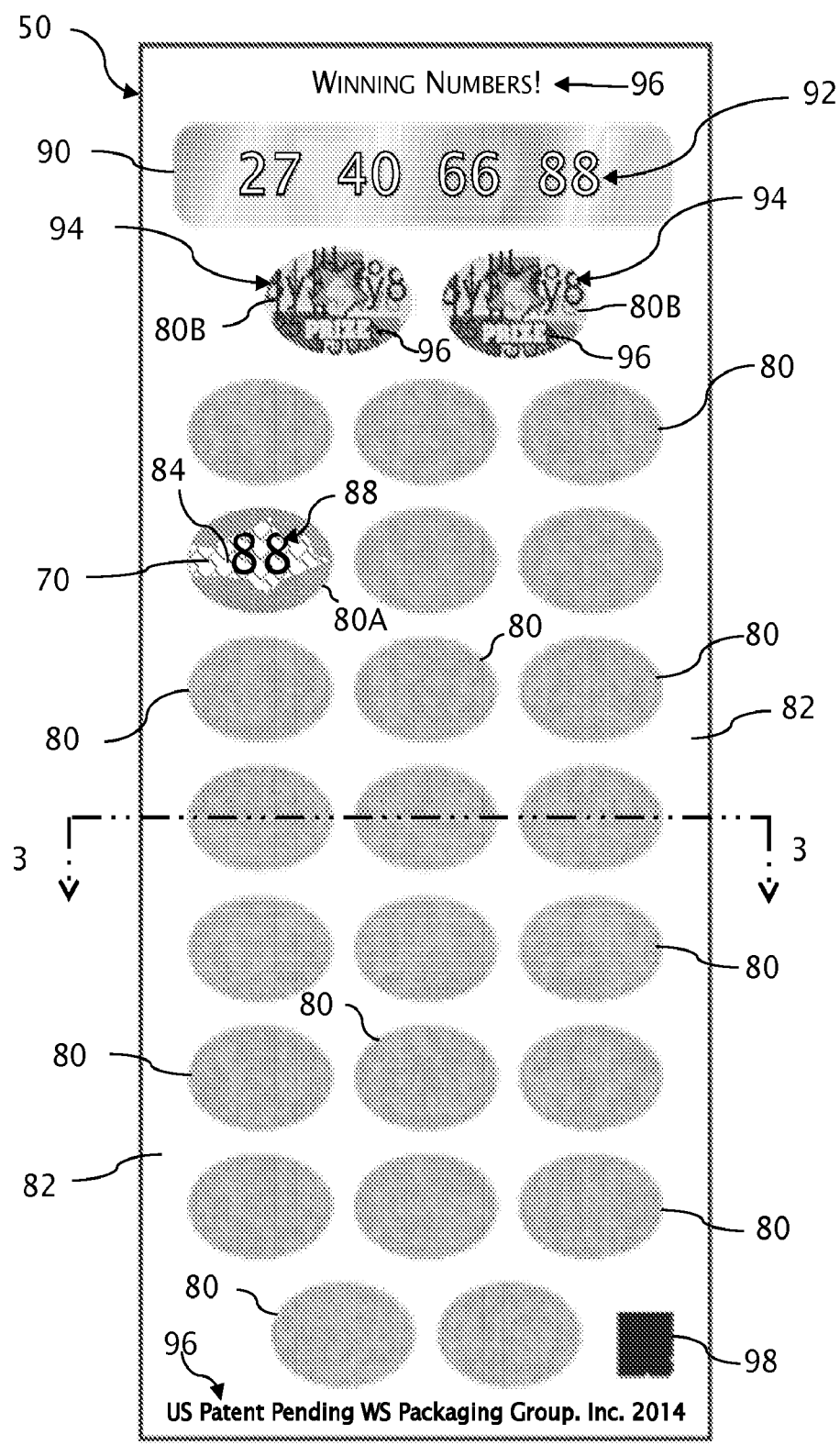
FIG. 4 is a front view of the direct thermal construct of FIG. 3.

The printed layers 60 and 70 can include multiple layers and multiple colors of ink for various purposes. As shown in FIG. 4, the front face of the on-demand printable construct 50 or any of the other constructs 10 or 40 can be printed with text, graphics, backgrounds, gaps, and overlays. For example, the printed layer 60 includes pattern printing for distinguishing islands 80 from a surrounding background 82. The islands 80, shown here as oval shaped, can be arranged for temporarily concealing registered thermal printing in predetermined areas inside the construct 50. The islands 80 not only define areas of the construct 50 intended for thermal printing through the metallized film cover substrate 52, the islands 80 also define areas wherein the metallized layer 18 is weakly enough bonded with its film backing 16 so as to be removable from its film backing 16 by a conventional scratching action with a finger nail or coin similar to the type of scratching action normally used for removing wax or latex ink coverings on preprinted lottery tickets.

For example, an island 80A is shown with a portion of its metallized layer 18 scratched off to reveal thermally printed characters 88 in the underlying thermosensitive imaging layer 20, here aptly represented by a thermally printed number "88". A corresponding portion of the film backing 16, which remains permanently bonded to the thermally printable medium base lamina 54, provides a window 84 through which the printed number "88" is visible within the underlying thermosensitive imaging layer 20. In addition, the window 84 of the film backing 16 protects the underlying thermosensitive imaging layer 20 from the effects of the abrasion required to remove the corresponding portion of the metallized layer 18.

Although the film backing 16 is generally intended to provide a clear window through which the underlying thermal printing, e.g., the number "88", is rendered visible by the removal of the overlying portion of the metallized layer 18, the film backing 16 can be tinted for such purposes as security, decoration, information, or visual impact. The tinting of the film backing 16 can also be coordinated with the printed layer 70 to produce desired visual effects. As shown in FIG. 4, the printed layer 70 appears as a scallop pattern within the window 84, but can be printed as a background color, pattern, shape, or other artistic rendering. The film backing 16 can also be die cut or otherwise fractured within the islands 80, particularly for security purposes, but can also be coordinated with the preprinted layer 70 to produce enhanced visual effects, such as by matching or complementing the printed pattern.

The printed layer 60 can also be used for printing a confusion pattern covering at least the islands 80, which are intended to obscure underlying thermal printing. In the view of FIG. 4, only two of the islands designated 80B are shown covered by confusion patterns 94 for purposes of simplifying the illustration but all of the islands 80 could be similarly covered. As shown, other indicia can be preprinted together with the confusion pattern including text and graphics as well as branded patterns by thermal printing, which can be coordinated to produce unique presentations.

While conventional single or multiple color confusion patterns could be used, the confusion pattern 94 is preferably printed with multiple inks or varnishes that exhibit different reflective characteristics within a range that varies optically from specular to diffuse and expressed in the ink or varnish within a range from high gloss through semi-gloss, satin, and eggshell to flat. Preferably, one of the inks or varnishes is a high gloss or semi-gloss mimicking the more specular reflective properties of the metallized layer cover lamina 52 that has not been subject to thermal printing and another of the inks or varnishes is a satin or eggshell mimicking the more diffuse reflective properties of the areas of the metallized film cover lamina 52 that have been subject to thermal printing. In addition, the two or more inks or varnishes exhibiting different reflective properties can be of the same color including no color at all. For example the printed inks of the confusion pattern can be printed with an ink having a color of white to gray for further limiting contrast with a metallized film containing a layer of aluminum. The two or more inks or varnishes that exhibit differing reflectivity characteristics can be printed in complementary patterns occupying pluralities of juxtaposed regions or can be printed one over the other in different patterns. In addition, the islands 80 can be overprinted by text or graphics 96, including background colors, patterns, logos, and images, for such purposes as labeling or otherwise controlling the visual appearance of the islands 80. Within the printed layer 60, the confusion pattern, text, and graphics can be printed on various levels to achieve the desired functionalities including visual presentation.

Instead of forming the metallized film is a conventional way resulting in a specularly reflective metallized surface, film backing 16, any intervening layers forming the release surface 34, or the deposition process itself can be varied to form a more diffuse reflective surface. For example, the front surface 26 of the film backing 16 alone or in combination with the release surface 34 can be formed with a matte surface onto which the metallized layer is deposited. The deposited metallized layer 18 at least partially incorporates the micro-surface geometry variations (roughness) of the underlying surface resulting in the necessary irregularities to produce a diffusely reflective surface. While thermal printing tends to produce locally diffuse areas in an overlying specular metallized layer, the diffuse metallized layer is less susceptible to undergoing any similarly significant change in reflectivity characteristics. Thus, fashioning at least the appearance of the metallized layer as a diffuse surface can obscure the effects of thermal printing through the metallized layer, which can obviate the need for printing a confusion layer overlying the metallized layer. The amount of roughness can be controlled so that the reflectivity characteristics exhibited by the metallized layer undergo a minimum change upon thermal printing. For example, the skin layer on the front surface 26 of the film backing 16 could contain particulate components such as fillers (e.g., talc), pigments, and other agents to produce a matte-like metallized surface. However, care should be taken to avoid any unnecessary increase in the opacity of the film backing 16 or adherence to the metallized layer 18.

Any of the printing and protective layers 56-62 overlying the metallized layer 18 within the designated islands 80 are removable together with the metallized layer 18 on which they are supported. That is, the overlying layers preferably lack requisite structural integrity that would prevent their removal or the removal of the underlying metallized layer by the intended form of abrasion. However, other areas of the construct 50 excluding the islands 80 can be covered by a scratch-resistant layer such as a more robust coating or protective film 72 that interferes with the intended scratching action so that only the metallized layer 18 within the designated islands 80 or other limited areas are subject to removal by the intended scratching action.

For example, the robust coating can be printed over one or more limited areas of the metallized film cover lamina 42, such as by stripe or pattern printing on press to leave the designated islands 80 exposed. Similarly, the protective film 72 can be laminated over one or more portions of the metallized film cover lamina 42 by precutting the protective film 72 in advance of its lamination or by cutting out and removing portions of the laminated protective film 72 before permanently bonding the protective film to the cover lamina 42. For example, prior to lamination, the protective film 72 together with an adhesive backing can be mounted on a release liner against which the protective film 72 is die cut to remove portions of the protective film 72 that would otherwise overlie areas of the cover lamina 42 intended for thermal printing. The protective film 72 can be clear for exposing the print layer 60 or a printed layer can be applied to either or both front and back surfaces of the protective film 72 in addition to or as a replacement for portions of the printed layer 60 that are covered by the protective film. The printhead slip coating 62 can be applied to the front surface of the protective film 72 as well as any to remaining exposed portions of the underlying laminae if necessary to reduce friction and avoid wear.

Although the islands 80 are shown in the shape of ovals and arranged in rows, the islands 80 can be individually shaped and positioned on the base lamina 54 as desired. For example, the islands 80 can be alternatively shaped as other geometric forms such as circles, triangles, rectangles, diamonds, trapezoids, and polygons and other familiar shapes such as stars, hearts, crescents, eggs, and clouds, as well as more fanciful or irregular shapes that might be associated with the intentions for printing the construct 50 or the islands 80 themselves including faces, cars, and other objects or symbols. Shapes of the islands 80 can be the same or different within a single construct and can be distributed in regular or irregular patterns in accordance with the requirements for hiding underlying information for presenting "scratch-off" options to users. The islands 80 are shown relatively displaced from one another but islands of complementary shapes could be clustered together like the pieces of a puzzle separated only by designated markings.

While the islands 80 can be distinguished by printing patterns alone on the face of the metallized film cover lamina 52, the islands 80 or any other subdivision of the metallized film cover lamina 52 can be isolated by die cutting through appropriate layers the metallized film cover lamina 52 and removing the remaining matrix. In this instance, the adhesive layer 24 is preferably similarly limited and the printed layer 70 can be used to contribute to the appearance of the construct 50 in the areas that are not covered by the remaining portion of the metallized film cover lamina 52. The slip coat 62 or a similar protective layer preferably covers both the exposed portion of the base lamina 54 as well as the remaining portion of the cover lamina 52.

In addition to producing thermally induced printed images 88 in the thermosensitive imaging layer 20, the same thermal printing operation can be used to produce a thermally induced printed images 92, e.g., "27, 40, 66, and 88", in an exposed portion 90 of the metallized film cover lamina 52 that is not covered by a confusion pattern 94 via a phenomenon referred to as "branding." Although both printed images 88 and 92 can be induced by comparable amounts of localized heat and pressure applied by a thermal printhead to the front surface of the metallized film cover lamina 52, the printed image 92 is formed by different mechanism than the printed image 88. Instead of inducing a color change in a thermosensitive medium, the heat and pressure applied to the surface of the metallized film cover substrate can locally change the reflectivity characteristics of the cover lamina 52. Untreated, the metallized film cover lamina 52 is substantially specularly reflective. The referenced thermal printing, however, renders the locally affected portions exposed to the heat and pressure of the printhead substantially more diffuse. Accordingly, light is reflected differently, i.e., more diffusely, from the locally affected portions with respect to the light that is reflected from the remaining exposed portion 90 of the metallized film cover lamina 52, producing the necessary contrast for rendering the printed image 92 visible. The printed image 92 can appear lighter or darker than the remainder of the exposed portion 90 depending on the position of an observer with respect to a light source illuminating the front surface of the metallized film cover lamina 52.

Depending on exposure, either of the printed layers 60 or 70 can contribute to the appearance or intended functionality of the on-demand thermal printable construct 50. For example, text or graphics 96, including background colors, patterns, logos, and images, can be added where needed. In addition, various codes can be preprinted on one or more internal or external layers or on-demand thermally printed in the thermosensitive imaging layer 20. For example, a serialization code 98 can be variably preprinted on the front of the on-demand thermally printable construct to identify the construct 50, its intended use, and the on-demand printing that the construct 50 is intended to support. So-called "top of form" registration marks can also be preprinted to aid in the thermal printing and dispensing of the individual constructs 50, especially when stored as a succession of individual constructs in an on-demand printing and dispensing unit. The presence of an underlying reflective film, particularly the metallized layer 18, also expands opportunities for producing visual impacts in which ambient light can be diffusely or specularly reflected through or around printed graphics.

Although the back surface 32 of the base substrate 22 has not been depicted with any layers of printing, the back surface 32 can also provide valuable "real estate" for presenting additional text or graphics, In addition, a confusion pattern can be printed on a back surface 32 of the base substrate 22 to further obscure images printed in the thermosensitive layer 20, especially where the base substrate 22 alone is not sufficiently opaque to hide the thermal printing 88 from unaided viewing.

Although the construct 50 is drawn as a further development of the construct 10, similar additional layers can be incorporated into the construct 40 as well, noting mainly that the order of thermal imaging layer 20 and the printed layer 70 are reversed. Although the printed layer 60 can remain supported on the film backing 16 and the printed layer 70 can remain supported on the base substrate 22, both printing layers 60 and 70 can also be supported by the film backing 16 as parts of metallized film cover lamina 42, which can be later bonded to another substrate of choice.

Similar to the other constructs, the on-demand printable constructs 50 can also be made as a succession of individual constructs 50, such as in the form of tickets, game pieces, coupons, collection pieces, labels, security cards, or vouchers, along an in-line press as a roll or stack, e.g., fan-folded stack, of the constructs 50, for further processing, distribution, or use. For example, both the metallized film cover lamina 12 and the thermally printable medium base lamina 14 can be supplied to an in-line press as webs in various stages of completion. The two webs can be further processed, laminated together following the application of the adhesive layer 24 to one or the other webs, subject to various possible forms of cutting, including die cutting through one or both webs in the form of patterns, slits or perforations, removing any unwanted matrix, and arranging the succession of constructs 50 as a roll or stack of constructs 50. The further processing on press can include printing, coating, or adding additional laminae to either or both webs.

Thermosensitive Imaging Layer

The thermosensitive imaging layer 20 can take a variety of known forms. For example, polymeric inks can be tuned to be used with thicker or thinner metallized films for printing on the underlying thermosensitive imaging layer 20. A triggering transition temperature can be formulated from room temperature to over 300° F. Tunable polymeric inks can be formulated at a convenient transition temperature to enable the construct of interest and to select a thermal printer of interest.

Compatible systems for generating color development reversibly, irreversibly, from colorless to a colored state based on ascending temperature, from a colored state to a colorless state based on descending temperature, solvation, hydration, or other chemical and physical stimuli to a colored state to a colorless state during the stimuli. Color transitions can be with and without color change hysteresis, including abrupt or broad transition color change options, utilize micro-encapsulation processes or un-encapsulated processes, and can find use in a wide range of applications. Natural product food-grade color developers are available for both ascending and descending color change compositions. Combinatorial chemistries, including leuco dye color formers and polydiacetylenic-based compounds, can serve as developers and possess their own intrinsic color change properties.

Polymeric ink formulations can be pre-polymerized and set at a given temperature setting for a pre-formulated ink or can be produced in a monomeric form and polymerized in-line and prior to assembly of an on-demand secured printed construct. In either case, the temperature setting and approach for formulation and polymerization provide for flexibility of adapting the temperature setting and dynamic or static sensitivity for a range of product applications of interest.

Pre-polymerized ink formulations can be conveniently prepared in aqueous ink vehicles. Aqueous ink formulations have the benefit of avoiding undesirable volatile solvents that most result in environmental concerns upon evaporation. Pre-polymerized aqueous ink are prepared by emulsifying monomeric diacetylenic compositions either in the crystalline state to a micro-particulate state or by forming an oil phase above the melting transition of the monomer and aggressively mixing the composition to a stable microemulsion form.

Aqueous vehicles can be selected for particular applications depending on their utility and compatibility with particular diacetylenic monomeric compounds. Upon adequate emulsification and particle sizing, the diacetylenic composition can be polymerized by using 254 nanometer ultraviolet light from a colorless to an enriched blue coloration typical and indicative of the polydiacetylene polymerization reaction. Alternatively, polymerization can be accomplished by using a gamma irradiation source of other compatible high-energy source such as cobalt 60.

Formulated polymeric inks can be used directly with commercial printing process, but importantly will need to be adjusted in viscosity, surface tension, surfactant loading, temperature setting, particle sizing, and ancillary component content depending on the application of interest. Similarly, stabilizing agents, preservatives, and anti-oxidants can be used for improved shelf-life and stability.

Monomeric components can generally be added at between 0.1% and up to 50% by weight. Usually, monomeric components will be added between 1% and 30% by weight to the final ink composition. More often, they will be added between 5% and 20% by weight. The exact concentration and monomeric composition depends on such factors as the desired loading, coloration intensity required, anilox roller loading, and printing method.

Solvent-based diacetylenic inks find use where it is practical to formulate a solvent based ink with dissolved diacetylenic monomers. Solvents provide for maintaining monomers in the dissolved state. When solvent based monomeric diacetylenic inks are printed and dried, the drying process facilitates the rapid and homogenous crystallization of the diacetylenic monomer. Once the monomeric solvent base ink has been printed and dried, the ink can be polymerized from a colorless state to a color blue state typical and illustrative of the formation of the polydiacetylenic polymer backbone.

The degree of polymerization can be utilized to adjust the temperature transition of the polymer color change thereby providing a convenient method to tune the ink temperature setting depending on the application of interest. By way of example, selected long chain diacetylenic compounds can be tuned in temperature form 120° F. to 200° F. depending on the level of polymerization. Uses and application diacetylenic and polydiactylenic compounds are well described elsewhere (Ribi U.S. Pat. Nos. 5,918,981 and 5,685,641).

Pigmented polymeric inks can be used with slightly thicker metallized films for printing on the back surface 28 of the film backing 16 or with thinner metallized films for printing on the underlying front face 30 of the base substrate 22. Commercially available irreversible pigmented thermochromic inks can be utilized in on-demand secured printed documents provided that the temperature transition, dynamic sensitivity and static sensitivities are suitable for the particular application of interest. Irreversible thermochromic inks can be sourced from commercial sources (e.g. Segan Industries, Inc. or Nucoat, Inc.) or prepared accordingly (Ribi, WO2008079357 A2) as well as other commercial sources.

Tunable compositions can be micro-encapsulated or non-micro-encapsulated depending on the application of interest. Encapsulate species provide the inherent robustness for many matrices or mediums such as plastics, certain paints, or robust coatings. Un-micro-encapsulated species provide a lower cost means to utilize said compositions where the compositions can be administered to a product application in fewer less costly steps. Various permutations of encapsulated on un-encapsulated tunable color generation compositions can be utilized. By way of example, but not limitation, developers and color formers can both be un-encapsulated. Alternatively, the developer can be encapsulated whereas the color former may be un-encapsulated. In another example, the developer may be un-encapsulated whereas the color former may be encapsulated. In addition, varying degrees of encapsulation may be utilized by one component or another.

Typically, irreversible pigmented thermochromic inks exhibit temperature thresholds in the range between 40° C. and 120° C. Usually, transition temperatures will find use between 50° C. and 110° C. with temperature transition in the range between 60° C. and 100° C. most favored. Irreversible pigmented inks can be formulated to adhere to and printed on the back surface 28 of the film backing 16 or on the front surface 30 of the apposing base substrate 22 of the construct. Pigmented adjustable irreversible color change inks provide flexibility for use in various construct configurations and uses with different thickness of substantially opaque obscuring layers.

Figure 5:
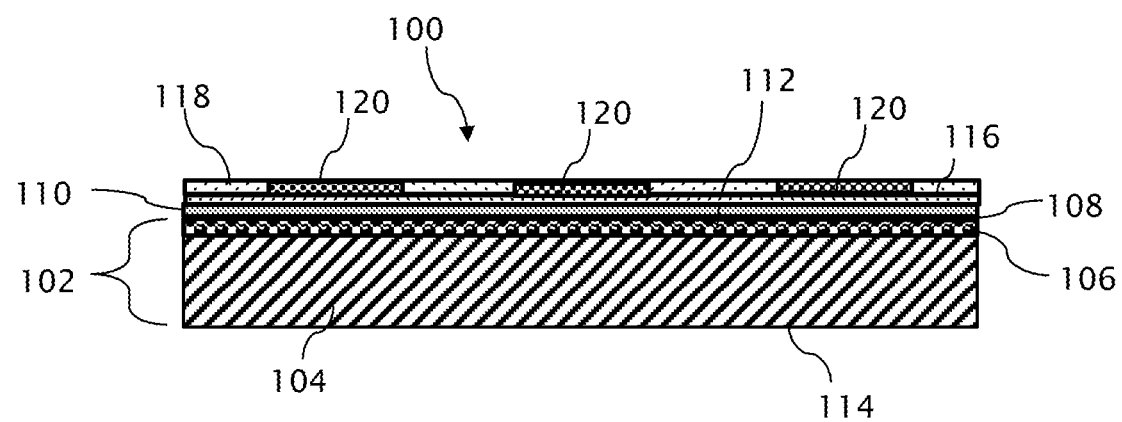
FIG. 5 is a similar cross-sectional side view of an alternative thermal printable construct assembled on a single substrate.

A direct thermal printable construct 100 in accordance with another embodiment of the invention is arranged as shown in FIG. 5 in a form that does not require lamination. Similar to the constructs 10, 40, and 50, the construct 100 can be printed for various purposes including as a ticket, game piece, coupon, collection piece, label, security card, or voucher. While the construct 100 includes a thermally printable medium 102 and a metallized layer 110, no intervening film type lamina or other substrate is used to support the metallized layer 110. Instead, the metallized layer 110 is supported on a front surface 112 of the thermally printable medium 102 via an intervening release surface 108.

As described in the preceding embodiments, the thermally printable medium 102 includes a thermosensitive imaging layer 106 atop a paper or film base substrate 104. As such, the thermally printable medium 102 can be of a type that is commercially available or can be formed by coating the thermosensitive imaging layer 106 on the base substrate 104. As a common support for both the thermosensitive imaging layer 106 and the metallized layer 110, the base substrate 104 can be composed of simple or composite materials in single or multiple layers at a thickness appropriate for the desire application.

The metallized layer 110 can be formed similar to the metallized layer 18 described above, but instead of using an intervening film to support the metallized layer 110, the metallized layer 110 is supported on the base substrate 104 in a form that preferably covers at least the areas of the thermosensitive imaging layer 106 that are intended to be thermally printed with temporarily hidden indicia. Within these areas, the thermosensitive imaging layer 106 is preferably coated or otherwise treated to form the release surface 108 that relatively weakens an interface bond to allow the metallized layer 110 to be scratched off of the front surface 112 of the thermally printable medium 102 to reveal the hidden indicia. Similar to the relationship between the release surface 34 and the film backing 16, the release surface 108 calibrates adhesion of the metallized layer 110 to the front surface 112 of the thermally printable medium 102 to assure that the metallized layer 110 stays in place during storage, transport, and normal handling while still allowing for the local removal of the metallized layer 110 by the scratching action of a fingernail or coin of a character used for removing scratch-off waxes or latex inks on conventional lottery tickets.

The desired limited adhesion can be achieved, for example, by applying a layer of release, such as silicone, to the front surface 112 of the thermally printable medium 102. The release can be applied in a pattern covering one or more limited areas of the thermosensitive imaging layer 106, particularly the areas intended for printing temporarily hidden indicia, or can be flood coated to cover all or uninterrupted portions of the thermosensitive imaging layer 106. For example, during vapor deposition of a metal, such as aluminum, for forming the metallized layer 110, the release surface 100 preferably forms an adequate bond with the deposited metal to hold the deposited metallized layer 110 in place. However, the bond formed between the metallized layer 110 and the front surface 112 of the thermally printable medium 102 through the release surface 108 can be readily broken, e.g., locally sheared, by the scratching action of a fingernail or a coin. Preferably, the release surface 108 itself or an intervening protective coating on the front surface 112 of the thermally printable medium 102 remains in place upon the local removal of the metallized layer 110 to protect the integrity of indicia formed in the thermosensitive imaging layer 106.

In addition to forming the release surface 108 with a conventional release material, the release surface could also be formed or otherwise characterized by weak adhesives or other bonding materials whereby the calibrated bond between the metallized layer 110 and the front surface 112 of the thermally printable medium 102 can be locally broken at one or more of (a) the interface between the metallized layer 110 and the layer of weak adhesive, (b) the interface between the layer of weak adhesive and the front surface 112 of the thermally printable medium 102, or (c) within the layer of weak adhesive, e.g., overcoming cohesion. Especially in the case where the break occurs at the interface between the layer of weak adhesive and the front surface 112 of the thermally printable medium 102, the thermosensitive imaging layer 106 preferably remains adequately protected such as by an intervening protective layer, if necessary, to assure that any hidden indicia printed in the layer 106 are not unduly abraded or subject to obscuration or removal by the scratching action intended for localized removal of the metallized layer 110. A substantial portion of conventional thermally printable media already includes a protective coating, such as PVA (polyvinyl alcohol), for various purposes including protecting the thermosensitive imaging materials from wear associated with contact with thermal printheads, chemical interactions, or other anticipated environmental engagements. The protection provided by these known protective layers can cooperate with the release surface 108 to accommodate the intended localized removal of the metallized layer 110 while preserving the integrity of thermosensitive imaging layer 106. In addition, such protective layers themselves can be adapted or further treated to form the desired release surface 108 from which the metallized layer 110 is locally removable. The intended break, e.g. shear, for removing the metallized layer can occur within or between any of one or more layers between the metallized layer 110 and the thermosensitive imaging layer 106 so long as the integrity of thermally printed indicia in the thermosensitive imaging layer 106 is preserved.

The release surface 108 can be pattern coated or otherwise formed over limited areas of the front surface 112 of the thermally printable medium 102 to support the localized removal of the metallized layer 110 within the limited areas. Similarly, the metallized layer 110 can be applied over limited areas of the front surface 112 of the thermally printable medium 102. If so, the limited areas over which the metallized layer 110 is applied preferably correspond at least in part to the limited areas over which the release surface 108 is applied to the front surface 112 of the thermally printable medium 102. However, the metallized layer 110 can also be formed over both areas of the front surface 112 of the thermally printable medium 102 that include the release surface 108 and areas of the front surface 112 of the thermally printable medium 102 that do not include the release surface 108 so that the metallized layer 110 can be arranged to be removable in some areas covered by the release surface 108 and not similarly removable in other areas not covered by the release surface 108. Any coextensive areas of the metallized layer 110 and the release surface 108 through which hidden indicia are not intended to be thermally printed can be covered by a scratch-resistant coating as described above. A back surface 114 of the thermally printable medium 102 can also be printed with one or more layers to increase opacity (such as by printing a confusion pattern). The back surface 114 could also be sealed with a protective layer such as a varnish or other coating to further protect or balance the construct 100 from environmental influences, such as warping.

Also similar to the preceding embodiments, one or more coatings 116 can be applied over the otherwise exposed surface of the metallized layer 110 for such purposes as protecting the metallized layer 110 from oxidation and other environmental hazards, including wear from thermal printheads, and readying the metallized layer 110 for other forms of printing in a repeatable or variable fashion. A printed layer 118 can be printed over top of any exposed portion of the metallized layer 110 or the thermosensitive imaging layer 106, as well as any remaining portion of the front surface of the thermally printable medium 102. Preferably, the printed pattern 118 includes pattern printing for distinguishing islands 120 from a surrounding background, which can be printed in the form of graphics or text consistent with the desired appearance and function of the construct 100. Particularly if the metallized layer 110 covers all or most of the front surface 112 of the thermally printable medium 102, the printed layer 118 can be patterned or include translucent layers that exploit the reflective characteristics of the metallized layer 110 to produce brighter graphical effects. The islands 120, which can take various shapes, identify predetermined areas of the thermosensitive imaging layer 106 intended for thermally printing temporarily hidden indicia through the metallized layer 110. While other portions of the thermosensitive imaging layer 106 may be subject to printing through the metallized layer 110 or through gaps in the metallized layer 110, the islands 120 define areas where the metallized layer 110 is intended to be removed by a conventional scratching action to reveal the hidden indicia. That is, the entire surface of the construct 100 can be subject to printing, and the islands 120 can be demarcated within such printing by color, pattern changes, or other graphics, including objects or shapes. In addition, the islands 120 can be distinguished by gaps in the printed layer 118 within which the metallized layer 110 remains visible. For example, the construct 100 can be printed similar to the construct 50 shown in FIG. 4. Although also not shown, a protective layer, such as a printhead slip coating, can be applied over all or a portion of the print layer 118, especially the portions intended for thermal printing.

By supporting the metallized layer 110 on the thermally printable medium 102 instead of on a backing film that is laminated together with the thermally printable medium 102, a stronger more direct thermally conductive pathway is provided between the metallized layer 110 and the thermosensitive imaging layer 106, which allows thermal printing of the thermosensitive imaging layer 106 at lower power levels. Within the regions intended for printing temporarily hidden indicia, the metallized layer 110 can be separated from the thermosensitive imaging layer 106 of the thermally printable medium 102 by as little as the release surface 108 that allows for the subsequent local removal of the metallized layer 110. Any protective or preparatory layers in addition to the release surface 108 applied to the thermosensitive imaging layer 106 are intended to have limited thickness and mass, which can be significantly less than required for the backing film and adhesive layer of the preceding embodiments. Thus, the hidden indicia can be thermally printed in the thermosensitive imaging layer 106 through the metallized layer 110 at lower printhead temperatures, which can reduce the effects of "branding" and lessen the need for compensatory printing. Of course, confusion patterns as described above can still be printed over metallized layer 110 to obscure any residual "branding" effects or for other security purposes.

In addition, intrinsic or imposed irregularities in the underlying surface or in the deposition process can be exploited to fashion the metallized layer as a diffuse, i.e., non-specular, surface, for obscuring or avoiding the effects of "branding" associated with thermal printing through the metallized layer 110. While thermal printing tends to produce locally diffuse areas in an overlying specular metallized layer, a diffuse metallized layer is less susceptible to undergoing any similarly significant change in reflectivity characteristics. Thus, fashioning at least the appearance of the metallized layer as a diffuse surface can obscure the effects of thermal printing through the metallized layer, which can obviate the need for printing a confusion layer overlying the metallized layer. Underlying irregularities, which can render the metallized layer diffuse, can be, for example a property such as the micro-surface geometry variations (roughness) of the underlying substrate 104, e.g., paper, that is adequately expressed through one or more intervening layers (e.g., a release layer). The underlying irregularities could also be formed in the intervening layers including a release layer for forming the release surface 108. The amount of roughness can be controlled so that the reflectivity characteristics exhibited by the metallized layer undergo a minimum change upon thermal printing. For example, the calendaring and coating operations can be controlled to adjust the surface characteristics of the thermally printable medium 102. Within the coatings, particulate components such as fillers (e.g., talc), pigments, and other agents can be added to produce a matte-like metallized surface. However, care should be taken to avoid any unnecessary increase in the opacity of the coatings or adherence to the metallized layer 18. For example, a release layer for forming the matte release surface 108 could be imbued with microparticles of polymeric wax, such as polytetrafluoroethylene (PTFE) having a low surface energy and coefficient of friction for limiting adhesion of the metallized layer 110 to the release surface 108.

The metallized layer 110 and release surface 108 are preferably formed over at least the areas of the thermosensitive imaging layer 106 intended to be thermally printed with the temporarily hidden indicia. In fact, the thermosensitive imaging layer 106 itself could be pattern coated or otherwise limited to such areas. For various purposes, any one of the metallized layer 110, release surface 108, and the thermosensitive imaging layer 106 can be patterned or otherwise limited to certain areas of the base substrate 104. For example, by limiting the release surface 108 to the areas occupied by the islands 120, a more extensive metallized layer 110 can form a more permanent bond with other areas thermally printable medium 102 that do not include the release surface 108. Alternatively, the metallized layer 110 could be deposited in a pattern matching or approximately matching an underlying pattern of the release surface 108 or could be deposited over limited areas of a more extensive release surface 108. The release surface 108 can be pattern coated or otherwise selectively applied according to conventional printing technologies, and the metallized film 110 can be selectively deposited through known masking technologies. Where more than one such layer is applied in a pattern, particularly on separate machines or presses, the layers must generally be registered with each other to assure proper alignment between the layers. For example, the different layers can be registered with respect to registration marks applied to the front or back surfaces 112 or 114 of the thermally printable medium 102.

Thermally printable media, especially direct thermal papers, are often produced as bulk media on extra wide rolls that are later cut to predetermined widths and lengths and rewound on rolls sized for direct thermal printers or for further conversion into different products or forms. Typically, an undercoating is applied to a paper web for receiving a thermal coating forming a thermosensitive imaging layer and the coated paper web is calendared to improve smoothness. One or more protective coatings can be applied to either the bulk media or a converted product to protect the thermal coatings forming the thermosensitive imaging layer from such factors as mechanical abrasion, chemical products, or climatic factors. Typically, a top coating is applied to the thermosensitive imaging layer, such as coatings made of polyvinyl alcohol (PVA), to protect against abrasion and other environmental influences. For bulk manufacture of constructs such as the construct 100, a release coating such as silicone can be applied in addition to or as a replacement for another protective layer. For bulk processing, the release coating would generally be applied in continuous stripes or as a flood coating, but during further conversion, the release coating could also be applied in more discrete patterns covering designated areas in the resulting construct. Pattern printing could also be applied to deaden the release characteristics of a more generally applied release coating in other designated areas.

Similarly, metallization typically takes place on extra wide webs that are fed through deposition chambers for depositing a metal such as aluminum onto the web. Typically, the webs are plastic films, but webs of paper have also been metallized by vacuum deposition processes. To assure an adequately smooth surface for depositing a thin layer of metal, the paper is typically calendared and coated with a smooth varnish or other protective coating. However, either or both the calendaring or the coating operations can be arranged to form a matte finish as described above for reducing the specularly reflective properties of the subsequently deposited metallized layer. As with most vacuum processing, care should also be taken to avoid unnecessary outgassing of moisture or other components from the webs presented for deposition.

For vacuum metalizing a direct thermal paper produced in bulk with a release surface as described above, the bulk direct thermal paper can be initially formed or can be further treated with a seal coating, such as a varnish, on its underside so that both sides of the bulk direct thermal paper are sealed. As a further advantage, such sealing can avoid curling effects during subsequent exposures or use associated with differential moisture absorption through the opposite sides of the resulting construct. In addition, the release surface itself is preferably formulated or subsequently treated to avoid unnecessary outgassing. Once deposited, a seal coating, such as a varnish or lacquer, can be applied over the metallized layer on the direct thermal paper to protect the metallized layer or to ready the metallized layer to accept conventional printing inks. In addition, the seal coating could be applied with a matte finish so that the metallized layer appears diffuse.

The bulk metallized direct thermal paper can be resized as required for conversion on a printing press arranged for printing on one or both sides of the metallized direct thermal paper. For example, the printing can be used to identify islands through which temporarily hidden indicia are intended to be thermally printed. Registration marks can also be added to provide a reference accessible to the thermal printer for thermally printing through the islands or other specified positions in the constructs in predetermined relationships with the registration marks. Printed graphics as well as physical separations such as slits and perforations can be used to distinguish individual constructs in the form of tickets or other pieces from one other.

While all or a portion of conventional color printing including text and graphics for fashioning the metallized direct thermal paper into tickets or other printed pieces can be performed on press in the form of either or both repeating patterns and ticket- or batch-unique content, such conventional printing could also be applied at the site intended for thermally printing the hidden indicia. For example, the bulk metallized direct thermal paper can be precut, e.g., slit, and rewound into appropriately sized rolls or fan-folded stacks for distribution to sites intended for thermally printing and dispensing individual tickets or other pieces. The pre-cut metallized direct thermal paper can also be impaled with perforations for partially dividing the rolls or stacks into predetermined lengths to aid in the dispensing and fuller separation of the tickets or other pieces from the remaining roll or stack and each other.

The dispensing station can take a variety of forms, including as a kiosk or vending machine. The dispensing station preferably includes a user interface for input and output of information, a thermal printer for printing hidden information on the tickets or other products, and a dispensing mechanism for delivering the printed tickets or other products to a customer or other user. The interface can include a video monitor for allowing the user to view and make selections such as among different games, options, or types of tickets or other products. The interface could also include a payment system whereby the user could make a purchase involving the tickets or other pieces. The dispensing station also preferably includes a conventional printer with toner or other ink on site for printing text or graphics on the tickets or other pieces. The text or graphics printed on the tickets or other pieces can be responsive to selections or other input from the user through the interface. The dispensing station could also include a communications interface for communicating with a computer network for controlling at least certain operations of the station, such as processing and recording of the user's input and the material content of the tickets or other products that are dispensed.

Figure 6A:
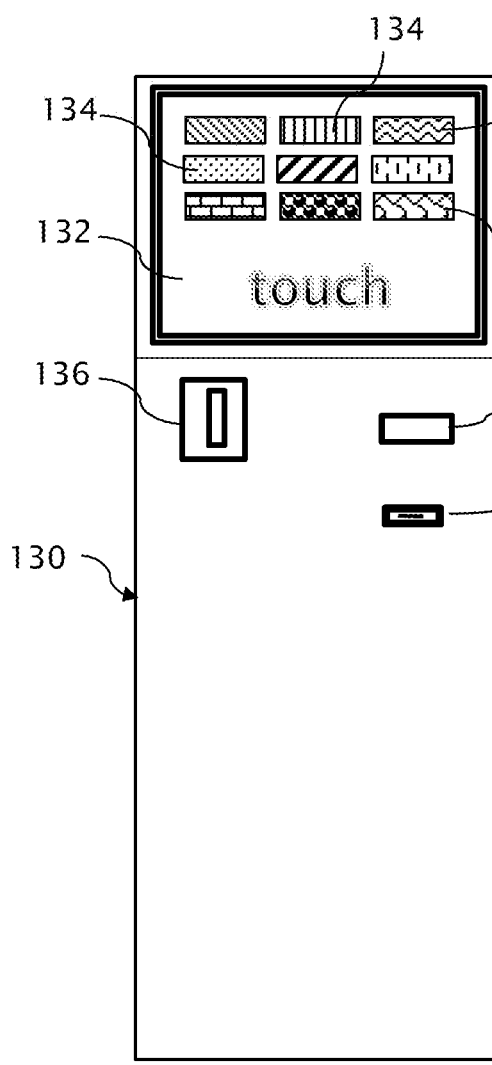
FIG. 6A is a schematic front view of a dispensing station for dispensing thermally printed constructs such as shown in the preceding figures.
Figure 6B:
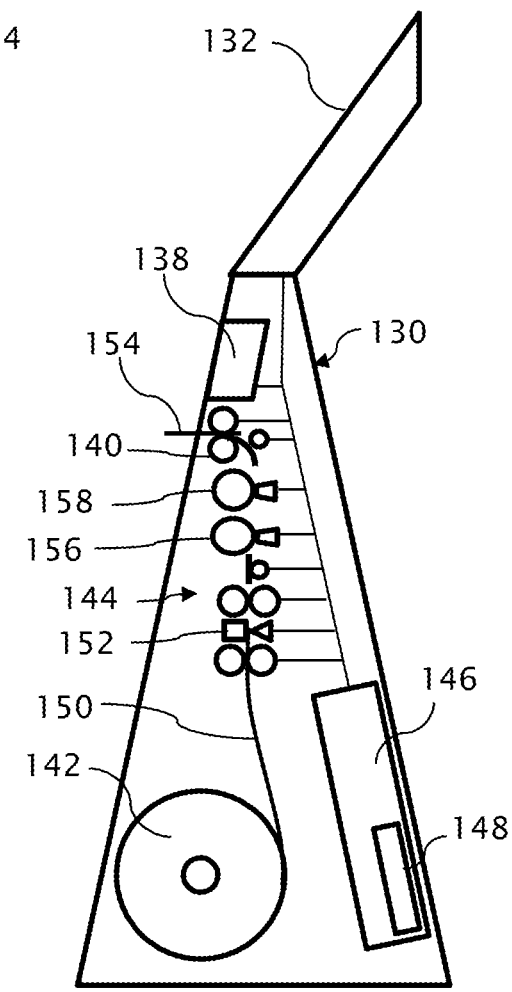
FIG. 6B is a schematic side view of the dispensing station of FIG. 6A depicting internal apparatus for printing and dispensing the thermally printed constructs.

For example, FIGS. 6A and 6B depict a dispensing station 130 such as a vending machine or kiosk with a touch screen video monitor 132 to present options to the customer or other user and to accept input from the user. Displayed on the monitor is an array of different tickets 134 corresponding to different games that can be selected by the user for play. The touch screen capability of the video monitor 132 allows the user to make selections, responses, and provide other input as necessary or desired to interact with the dispensing station 130. Other alternative forms of interfaces including keypads, touchpads, voice recognition software, and other modes of communication based on sound, position, movement, or other machine decipherable expressions of the user. Wireless communication links could also be established with communication devices of the user. The depicted station 130 also includes both a card reader 136 and a bill acceptor 138 as examples of further interfaces for accepting payments from the user. In addition, a ticket dispenser 140 includes an opening through which a ticket can be dispensed to the user based on the user's inputs to the dispensing station 130.

In the side view of FIG. 6B, a roll 142 of metallized direct thermal stock is connected to a feed mechanism 144 under the control of a computer processor/controller 146 that interacts with both elements of the feed mechanism 144, the various interfaces, including the touch screen video monitor 132, the card reader 136, and the bill acceptor 138, and a network communications interface 148. The metallized direct thermal stock can take the form of any of the embodiments described herein and can be preprinted with a succession of common text or graphics, as well as serialized or other unique information, or could be entirely blank. Instead of being loaded into the dispenser station 130 in the form of a roll, the metallized direct thermal stock could be loaded as a fan-folded stack or even as a stack of precut tickets. In the depicted embodiment, the roll 142 of metallized direct thermal stock supplies a succession of blank tickets separated by lines of perforation.

In response to a command from the processor/controller 146, the feed mechanism 144 advances a web 150 of the metallized direct thermal stock to a bursting mechanism 152 that separates an individual ticket 154 from the web 150 along a line of perforation. Thereafter, the web 150 is largely held in place, and the individual ticket 154 is advanced through printing stations 156 and 158 and dispensed through the ticket dispenser 140. The printing station 156 is a direct thermal printer in communication with the processor/controller 146 and preferably a remote network or central processing system for controlling the content of the hidden indicia in the thermosensitive imaging layer that is printed by the thermal printer through the metallized layer. The print station 158 can be a conventional digital color printer, such as a toner-based printer or a liquid inkjet printer, with an on-board toner or other ink supply for printing text and graphics on the front or back of the ticket 154 as desired. Thermal transfer printing could also be used for color printing the tickets, where the application of heat does not produce unwanted imaging in the thermosensitive imaging layer. The printing station 158 is also in communication with the processor/controller 146 so that the material printed on the ticket 154 preferably corresponds at least in part to selections or other input provided by the user through the touch screen video monitor 132 or other station interface. Ticket edges or other demarcating features of the tickets can be monitored by one or more reading mechanisms (not shown) for registering the printed content of both printing stations 156 and 158 to the ticket 154 and each other. The printed ticket 154 is then advanced to the dispenser 140 for delivery to the user.

For security or accounting purposes, the ticket 154 is also preferably printed with a unique code, such as a one-dimensional or two-dimensional bar code or quick response (QR) code that is associated with the content of the hidden thermally printed indicia and the applicable rule set through which any redemption value of the printed ticket is determined. The unique code can the printed by either or both printing stations 156 and 158 or could be preprinted on the tickets and read by the dispensing station 130. A similar reader could also be used to verify that the proper code was printed by one or both printing stations 156 and 158. The unique code can be generated by and stored on the network and associated with the user inputs, a dispensing station identifier, the commands delivered to and executed by the dispensing station including the printed hidden indicia, and the game outcome including any reward due.

Although the printing stations 156 and 158 could be arranged in any order along the feed mechanism 144, applying the thermal printing first allows the conventional printing to apply a color or pattern over the thermally printed areas of the tickets for further obscuring any discernable effects of the thermal printing or for more graphically identifying the areas of the metallized layer intended for removal by the user. The ticket 154 could also be printed while remaining as a part of the web 150 and later separated from the web 150 in advance of the dispenser 140 or as a part of the dispensing operation. As such, the feed mechanism 144 could be arranged to move the web 150 in forward or reverse directions to present individual tickets for printing.

The conventional color print station 158 could be arranged together with the processor/controller to print tickets of different styles or rules of play associated with the selections made by the user. In addition, the tickets could be personalized in accordance with information supplied by the user or otherwise acquired by the station. For example, the user could input a message to the printed on the ticket in addition to any selections or inputs supplied by the user. Special offers could also be printed on the tickets based on user information or other information available to the station, such as discount offers or redemption bonuses to incentivize future purchases.

Many of the descriptions have featured thermally printable constructs in the form of tickets, such as on-demand printable lottery tickets, the associated teachings apply to a variety of other on-demand printable pieces as well as to the stock from which such pieces can be converted. Such on-demand printable stock can be conventionally preprinted with one or more added layers prior to final conversion or made available to a further conversion process in an unprinted form.

Generally, the processes of adding a thermosensitive imaging layer to a substrate and adding a metallized layer to a substrate take place along separate in-line processes. However, such different processes can be integrated in support of one of more of the embodiments described herein by processing the same web of substrate material through both processes in sequence. The release surface could also be added as a part of one or the other the inline processes, such as by forming the release surface as a treatment or coating in the same inline process by which the thermosensitive imaging layer is added to the web substrate.

Figure 7:
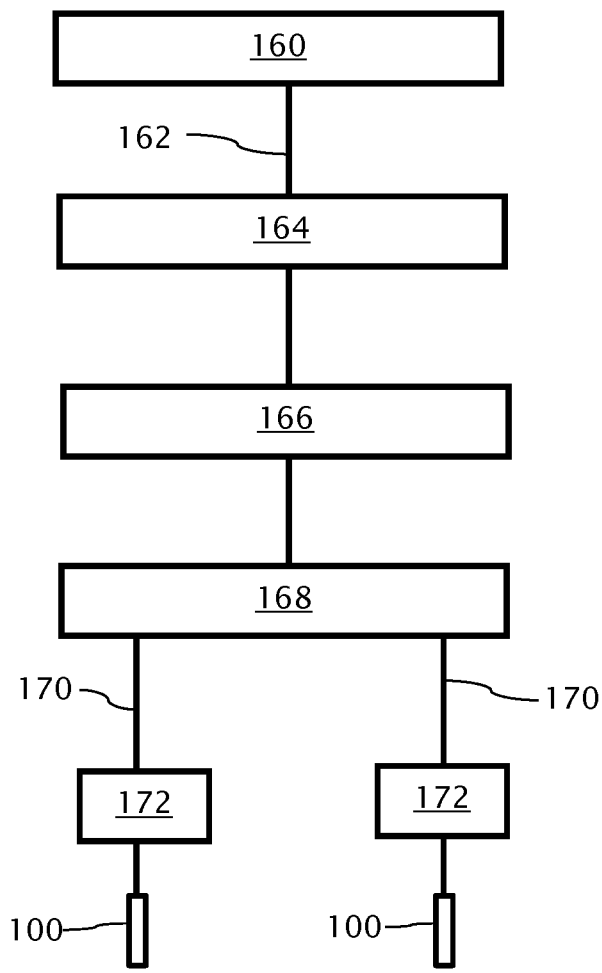
FIG. 7 is a block diagram showing various stages of press processing direct thermal printable constructs.

In conjunction with the more detailed discussion above, FIG. 7 depicts a processing sequence for the direct thermally printable constructs 100. Press operation 160 forms the thermally printable medium 102 in a web form 162, including the application of the thermosensitive imaging layer 106 in a desired form as described above. Press operation 164 forms the release surface 108 in a desired form as described above over the thermosensitive imaging layer 106 on the front surface 112 of the thermally printable medium 102 in web form 162. Press operation 166 applies the metallized layer 110 in a desired form as described above over at least one or more portions of the release surface 108 on the front surface 112 of the thermally printable medium 102 without an intervening substrate. The release surface 108 releasably bonds the metalized layer 110 to the front surface 112 of the thermally printable medium 102. Other press operations 168 include overprinting the metallized layer 110 or other portions of the front 112 or back 114 surfaces of the thermally printable medium 102 in web form 162 for the variously described purposes and cutting the web 162 of the thermally printable medium 102 into at least one of rolls, fan-folded stacks, and sheets designated generally at 170 to prepare the direct thermal constructs 100 for subsequent thermal printing. Additional press operations 172 can be performed at individual dispensing stations, such as the dispensing station 130, including thermally printing the direct thermal constructs 100 as described above for inducing the local changes in the color of the thermosensitive imaging layer 106 that are obscured from view through both the metallized layer 110 and the base substrate 104 in response to user input at the dispensing stations. Color printing over the front surface 112 of the thermally printable medium 102 can also take place at the dispensing stations as described above in a fashion that is not obscured by the metallized layer 110 in response to user input at the dispensing stations. Once dispensed, the releasable bond between the metallized layer 110 and the thermally printable medium 102 in the individual direct thermal constructs 100 can be locally sheared, such as by a scratching action of a fingernail or coin, for revealing the local changes in the color of the thermosensitive imaging layer 106.

While the above description references certain embodiments in detail, it will be understood that variants of these embodiments and other features and functions and alternatives thereof may be combined into many other different systems or applications. As such, various presently unforeseen or unanticipated alternatives, modifications, variations or improvements therein may be subsequently made by those skilled in the art, which are also intended to be encompassed by the following claims.

The invention claimed is:

1. A direct thermal printable construct comprising:
   a thermally printable medium having front and back surfaces, a base substrate proximate the back surface, and a thermosensitive imaging layer proximate the front surface;
   the thermosensitive imaging layer being subject to color change by thermal printing;
   at least one or more portions of the thermosensitive imaging layer being covered with a release surface;
   at least one or more portions of a metallized layer being releasably bonded to the front surface of the thermally printable medium through the release surface;
   the thermosensitive imaging layer being thermally printable by exposing the metallized layer to localized heat of a thermal printer for inducing local changes in a color of the thermosensitive imaging layer that are obscured from view through both the metallized layer and the base substrate; and one or more areas of the metallized layer being arranged to be removable from the front surface of the thermally printable medium via the release surface for revealing underlying local changes in the color of the thermosensitive imaging layer;

in which one or more other portions of the thermosensitive imaging layer are not covered with the release surface, and one or more other areas of the metallized layer cover portions of the thermosensitive imaging layer that are not covered by the release surface to form a more permanent bond with the front surface of the thermally printable medium.

2. The direct thermal printable construct of claim 1 in which the release surface comprises a release layer that forms a bond between the metallized layer and the front surface of the thermally printable medium that is arranged to be locally sheared by a scratching action of a fingernail or coin at one or more of (a) an interface between the metallized layer and the release layer, (b) an interface between the release layer and the front surface of the thermally printable medium, and (c) within the release layer.

3. The direct thermal printable construct of claim 1 in which the release surface is formed by treating the front surface of the thermally printable medium to exhibit a limited amount of adhesion with the metallized layer for forming a bond between the metallized layer and the thermally printable medium.

4. The direct thermal printable construct of claim 1 in which the metallized layer is overprinted to identify the one or more areas of the metallized layer arranged for release from the front surface of the thermally printable medium in positions overlying areas of the thermosensitive imaging layer that are registered for thermally printing hidden indicia.

5. The direct thermal printable construct of claim 1 in which the metallized layer is confined to covering one or more limited areas of the front surface of the thermally printable medium such that at least one other area on the front surface of the thermally printable medium is not covered by the metallized layer.

6. The direct thermal printable construct of claim 1 in which the one or more areas of the metallized layer that are removable from the front surface of the thermally printable medium are removable by a scratching action using a fingernail or coin for viewing the underlying local changes in the color of the thermosensitive imaging layer, and in which the one or more areas of the metallized layer that are removable from the front surface of the thermally printable medium are arranged as a plurality of distinct islands for identifying areas of the metallized layer that are intended for removal to reveal the underlying local changes in the color of the thermosensitive imaging layer.

7. The direct thermal printable construct of claim 6 in which at least one of the distinct islands is overprinted in a manner for obscuring local changes in a reflectivity of the metallized layer caused by the localized heat of the thermal printer.

8. The direct thermal printable construct of claim 1 in which the one or more areas of the metallized layer that are removable from the front surface of the thermally printable medium are removable by a scratching action using a fingernail or coin and are distinguished from other areas of the metallized layer that are protected by a scratch-resistant layer.

9. The direct thermal printable construct of claim 1 in which the metallized layer is limited to covering only portions of the thermosensitive imaging layer that are covered by the release surface, and the at least one or more portions of the metallized layer cover some but not all portions of the thermosensitive imaging layer that are covered by the release surface.

10. The direct thermal printable construct of claim 1 in which the release surface is formed as a protective coating covering the thermosensitive imaging layer.

11. The direct thermal printable construct of claim 1 in which a protective coating covers the thermosensitive imaging layer and the release surface is formed by a release layer between the metallized layer and the protective coating.

12. The direct thermal printable construct of claim 1 in which at least one of the at least one or more portions of the metallized layer appears as a diffuse reflective surface for reducing apparent changes in a reflectivity of the metallized layer caused by the localized heat of the thermal printer.

13. The direct thermal printable construct of claim 12 in which the release surface comprises micro-surface geometry variations that are incorporated into the metallized layer for forming the at least one of the at least one or more portions of the metallized layer with a diffuse reflective surface.

14. The direct thermal printable construct of claim 12 in which the release surface comprises micro-surface geometry variations that are incorporated into the metallized layer for forming the at least one of the at least one or more portions of the metallized layer with a diffuse reflective surface.

15. A direct thermal printable construct comprising:
a thermally printable medium having front and back surfaces, a base substrate proximate the back surface, and a thermosensitive imaging layer proximate the front surface;
the thermosensitive imaging layer being subject to color change by thermal printing;
at least one or more portions of the thermosensitive imaging layer being covered with a release surface;
at least one or more portions of a metallized layer being releasably bonded to the front surface of the thermally printable medium through the release surface;
the thermosensitive imaging layer being thermally printable by exposing the metallized layer to localized heat of a thermal printer for inducing local changes in a color of the thermosensitive imaging layer that are obscured from view through both the metallized layer and the base substrate; and
in which the one or more areas of the metallized layer are arranged to be removable from the front surface of the thermally printable medium via the release surface, for revealing underlying local changes in the color of the thermosensitive imaging layer, by a scratching action using a fingernail or coin and are distinguished from other areas of the metallized layer that are protected by a scratch-resistant layer.

16. The direct thermal printable construct of claim 15 in which the release surface comprises a release layer that forms a bond between the metallized layer and the front surface of the thermally printable medium that is arranged to be locally sheared by the scratching action of the fingernail or coin at one or more of (a) an interface between the metallized layer and the release layer, (b) an interface between the release layer and the front surface of the thermally printable medium, and (c) within the release layer.

17. The direct thermal printable construct of claim 15 in which the release surface is formed by treating the front surface of the thermally printable medium to exhibit a limited amount of adhesion with the metallized layer for forming a bond between the metallized layer and the thermally printable medium.

18. The direct thermal printable construct of claim 15 in which the metallized layer is overprinted to identify the one or more areas of the metallized layer arranged for release from the front surface of the thermally printable medium in positions overlying areas of the thermosensitive imaging layer that are registered for thermally printing hidden indicia.

19. The direct thermal printable construct of claim 15 in which the metallized layer is confined to covering one or more limited areas of the front surface of the thermally printable medium such that at least one other area on the front surface of the thermally printable medium is not covered by the metallized layer.

20. The direct thermal printable construct of claim 15 in which the one or more areas of the metallized layer that are removable from the front surface of the thermally printable medium are arranged as a plurality of distinct islands for identifying areas of the metallized layer that are intended for removal to reveal the underlying local changes in the color of the thermosensitive imaging layer.

21. The direct thermal printable construct of claim 20 in which at least one of the distinct islands is overprinted in a manner for obscuring local changes in a reflectivity of the metallized layer caused by the localized heat of the thermal printer.

22. The direct thermal printable construct of claim 15 in which one or more portions of the thermosensitive imaging layer are not covered with the release surface, and one or more other portions of a metallized layer cover portions of the thermosensitive imaging layer that are not covered by the release surface to form a more permanent bond with the front surface of the thermally printable medium.

23. The direct thermal printable construct of claim 15 in which the metallized layer is limited to covering only portions of the thermosensitive imaging layer that are covered by the release surface, and the at least one or more portions of the metallized layer cover some but not all portions of the thermosensitive imaging layer that are covered by the release surface.

24. The direct thermal printable construct of claim 15 in which the release surface is formed as a protective coating covering the thermosensitive imaging layer.

25. The direct thermal printable construct of claim 15 in which a protective coating covers the thermosensitive imaging layer and the release surface is formed by a release layer between the metallized layer and the protective coating.

26. The direct thermal printable construct of claim 15 in which at least one of the at least one or more portions of the metallized layer appears as a diffuse reflective surface for reducing apparent changes in a reflectivity of the metallized layer caused by the localized heat of the thermal printer.

27. A direct thermal printable construct comprising:
a thermally printable medium having front and back surfaces, a base substrate proximate the back surface, and a thermosensitive imaging layer proximate the front surface;
the thermosensitive imaging layer being subject to color change by thermal printing;
at least one or more portions of the thermosensitive imaging layer being covered with a release surface;
at least one or more portions of a metallized layer being releasably bonded to the front surface of the thermally printable medium through the release surface;
the thermosensitive imaging layer being thermally printable by exposing the metallized layer to localized heat of a thermal printer for inducing local changes in a color of the thermosensitive imaging layer that are obscured from view through both the metallized layer and the base substrate; and
one or more areas of the metallized layer being arranged to be removable from the front surface of the thermally printable medium via the release surface for revealing underlying local changes in the color of the thermosensitive imaging layer;
in which at least one of the at least one or more portions of the metallized layer appears as a diffuse reflective surface for reducing apparent changes in a reflectivity of the metallized layer caused by the localized heat of the thermal printer; and
in which the release surface comprises micro-surface geometry variations that are incorporated into the metallized layer for forming the at least one of the at least one or more portions of the metallized layer with a diffuse reflective surface.

\* \* \* \* \*

UNITED STATES PATENT AND TRADEMARK OFFICE
CERTIFICATE OF CORRECTION

PATENT NO. : 11,395,956 B2
APPLICATION NO. : 16/326323
DATED : July 26, 2022
INVENTOR(S) : Chauncey T. Mitchell et al.

It is certified that error appears in the above-identified patent and that said Letters Patent is hereby corrected as shown below:

On the Title Page

Column 1, Item (71) Applicant, "W/S Packaging Group, Inc., Greenbay, WI" should be --W/S Packaging Group, Inc., Batavia, OH--.

In the Specification

Column 1, Line 59, "according a" should be --according to a--.

Column 5, Line 16, "can overprinted" should be --can be overprinted--.

Column 8, Line 41, "can includes" should be --can include--.

Column 9, Line 29, "metalized layer" should be --metallized layer--.

Column 9, Lines 29-30, "metalized layer from other areas of the metallized that are intended to be" should be --metallized layer from other areas of the metallized layer that are intended to be--.

Column 9, Line 37, "registry with the one or stripes" should be --registry with the one or more stripes--.

Column 9, Line 64, "indicia can be" should be --indicia that can be--.

Column 12, approx. Line 16, "thermal printheads" should be --thermal printhead--.

Column 13, Lines 25-26, "a coin." should be --or coin.--.

Column 14, Line 47, "can supplied" should be --can be supplied--.

Signed and Sealed this
Twenty-first Day of February, 2023

Katherine Kelly Vidal
*Director of the United States Patent and Trademark Office*

CERTIFICATE OF CORRECTION (continued)
U.S. Pat. No. 11,395,956 B2

Column 14, Line 50, "can be further be further" should be --can be further--.

Column 14, Line 66, "include" should be --includes--.

Column 17, Lines 49-50, "film is a conventional way" should be --film in a conventional way--.

Column 18, Line 44, "as well as any to" should be --as well as to any--.

Column 19, Line 14, "to produce a thermally" should be --to produce thermally--.

Column 19, Line 22, "by different mechanism" should be --by a different mechanism--.

Column 19, Line 65, "graphics, In addition," should be --graphics. In addition,--.

Column 21, Line 8, "ink" should be --inks--.

Column 21, Line 25, "process," should be --processes,--.

Column 21, Line 55, "form" should be --from--.

Column 21, Lines 56-57, "application diacetylenic and polydiactylenic compounds" should be --application of diacetylenic and polydiacetylenic compounds--.

Column 22, Lines 12-14, "on un-encapsulated" should be --or un-encapsulated--.

Column 28, Line 16, "including" should be --include--.

Column 29, Line 15, "can the printed" should be --can be printed--.

Column 29, Line 44, "to the printed on the ticket" should be --to be printed on the ticket--.

Column 29, Line 66, "one or the other the" should be --one or the other of the--.